United States Patent
Park et al.

(10) Patent No.: US 10,496,196 B2
(45) Date of Patent: Dec. 3, 2019

(54) APPARATUS AND METHOD FOR PROVIDING ADDITIONAL INFORMATION ACCORDING TO ROTARY INPUT

(71) Applicant: Samsung Electronics Co., Ltd., Gyeonggi-do (KR)

(72) Inventors: Nojoon Park, Gyeonggi-do (KR); Doo-Suk Kang, Gyeonggi-do (KR); Geon-Soo Kim, Gyeonggi-do (KR); Jung-Hwan Ku, Gyeonggi-do (KR); Dong-Jin Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/150,664

(22) Filed: May 10, 2016

(65) Prior Publication Data
US 2016/0334888 A1   Nov. 17, 2016

(30) Foreign Application Priority Data
May 13, 2015   (KR) .................. 10-2015-0066693

(51) Int. Cl.
*G06F 3/033*   (2013.01)
*G06F 3/0362*   (2013.01)
(Continued)

(52) U.S. Cl.
CPC ........... *G06F 3/0362* (2013.01); *G04G 21/00* (2013.01); *G06F 1/163* (2013.01); *G06F 1/169* (2013.01);
(Continued)

(58) Field of Classification Search
None
See application file for complete search history.

(56) References Cited

U.S. PATENT DOCUMENTS 5,999,176 A * 12/1999 Kamper ............... G06F 3/0485
                                                      715/787
6,421,071 B1 * 7/2002 Harrison .......... G01R 31/31935
                                                      715/787
(Continued)

FOREIGN PATENT DOCUMENTS

EP           2 733 598 A2    5/2014
KR     10-2011-0040087 A    4/2011
(Continued)

OTHER PUBLICATIONS

Dictionary.com definition of rotary, www.dictionary.com/browse/rotary?s=t, p. 1.*
(Continued)

*Primary Examiner* — Lunyi Lao
*Assistant Examiner* — Kirk W Hermann
(74) *Attorney, Agent, or Firm* — Cha & Reiter, LLC.

(57) ABSTRACT

An electronic device, comprising: a rotary input module; a display; a memory; and at least one processor operatively coupled to the memory, configured to: detect a rotary input via the rotary input module; generate second information associated a first information that is displayed on the display; display the first information and the second information on the display; and change at least some of the first information and the second information based on the rotary input, and displaying the same.

14 Claims, 28 Drawing Sheets

(51) Int. Cl.
*G06F 3/0482* (2013.01)
*G06F 1/16* (2006.01)
*G04G 21/00* (2010.01)

(52) U.S. Cl.
CPC .. *G06F 3/0482* (2013.01); *G06F 2203/04803* (2013.01)

(56) References Cited

U.S. PATENT DOCUMENTS

| | | | | |
|---|---|---|---|---|
| 6,448,987 | B1* | 9/2002 | Easty | G06F 3/0482 715/834 |
| 6,556,222 | B1* | 4/2003 | Narayanaswami | G04G 9/0064 368/295 |
| 6,744,427 | B2 | 6/2004 | Maglio et al. | |
| 6,803,905 | B1* | 10/2004 | Capps | G06F 3/04886 345/172 |
| 6,809,724 | B1* | 10/2004 | Shiraishi | G06F 1/163 345/157 |
| 2002/0101457 | A1* | 8/2002 | Lang | G06F 1/163 715/856 |
| 2005/0001821 | A1* | 1/2005 | Low | G06F 3/0362 345/169 |
| 2005/0183012 | A1* | 8/2005 | Petro | G06F 3/0482 715/713 |
| 2007/0209018 | A1* | 9/2007 | Lindemann | G06F 3/04855 715/784 |
| 2008/0165153 | A1* | 7/2008 | Platzer | G06F 1/1626 345/173 |
| 2008/0231577 | A1* | 9/2008 | Lin | G09G 3/3607 345/90 |
| 2009/0183100 | A1* | 7/2009 | Eom | G06F 3/0482 715/769 |
| 2009/0204920 | A1* | 8/2009 | Beverley | G06T 3/4038 715/768 |
| 2010/0056221 | A1* | 3/2010 | Park | G06F 3/048 455/566 |
| 2010/0229088 | A1* | 9/2010 | Nakajima | G06F 3/048 715/702 |
| 2010/0281374 | A1* | 11/2010 | Schulz | G06F 3/0482 715/723 |
| 2010/0318928 | A1* | 12/2010 | Neuman | G06F 3/0482 715/769 |
| 2011/0083104 | A1* | 4/2011 | Minton | G06F 3/04886 715/815 |
| 2012/0131504 | A1 | 5/2012 | Fadell et al. | |
| 2014/0143737 | A1 | 5/2014 | Misty et al. | |
| 2015/0012877 | A1* | 1/2015 | Lee | G04G 21/08 715/786 |
| 2016/0299988 | A1* | 10/2016 | Pancharathi | G06F 17/30896 |

FOREIGN PATENT DOCUMENTS

| | | |
|---|---|---|
| KR | 10-2011-0068068 A | 6/2011 |
| KR | 10-2014-0064690 A | 5/2014 |
| WO | 2015/034960 A1 | 3/2015 |

OTHER PUBLICATIONS

Dictionary.com definition of designate, www.dictionary.com/browse/designate?s=t, p. 1.*
Dictionary.com definition of side, www.dictionary.com/browse/side?s=t, p. 1.*
Dictionary.com definition of module, www.dictionary.com/browse/module?s=t, p. 1.*
Dictionary.com definition of index, www.dictionary.com/browse/index?s=t, p. 1.*
Dictionary.com definition of specified, www.dictionary.com/browse/specified?s=t, p. 1.*
Dictionary.com definition of object, www.dictionary.com/browse/object?s=t, p. 1.*
Dictionary.com definition of object, 2019, https://www.dictionary.com/browse/object#, p. 1 (Year: 2019).*
European Search Report, dated Aug. 23, 2016.
European Search Report dated Oct. 11, 2017.
European Search Report dated Aug. 8, 2018.

* cited by examiner

910

920

930

940

950

960

APPARATUS AND METHOD FOR PROVIDING ADDITIONAL INFORMATION ACCORDING TO ROTARY INPUT

CLAIM OF PRIORITY

This application claims the priority under 35 U.S.C. § 119(a) to Korean Application Serial No. 10-2015-0066693, which was filed in the Korean Intellectual Property Office on May 13, 2015, the entire content of which is hereby incorporated by reference.

TECHNICAL FIELD

The present disclosure relates to electronic devices in general, and more particularly, to a method and apparatus for providing additional information based on a rotary input.

BACKGROUND

Recently, with the development of digital technologies, various electronic devices have been released to the market, which can perform communication and personal information processing while being carried. For example, mobile communication terminals, Personal Digital Assistants (PDA), electronic organizers, smart phones, tablet Personal Computers (PC), and the like. The electronic device is equipped with various functions, such as, a voice call, transmission of a message such as Short Message Service (SMS)/Multimedia Message Service (MMS), and the like, a video call, an electronic organizer, photographing, transmission/reception of e-mails, reproduction of broadcasting programs, Internet, reproduction of music, scheduling, Social Networking Service (SNS), a messenger, a dictionary, a game, and the like.

Also, as a type of electronic device, a wearable device has been developed that can be used by being directly worn on a body part. For example, the wearable device may be provided in various forms that may be detachable from a body part or clothes, such as a Head-Mounted Display (HMD), smart glasses, a smartwatch or wristband, a contact lens-type device, a ring-type device, a shoe-type device, a clothes-type device, a purse-type device, and the like. The wearable device can be used by being connected with an electronic device.

SUMMARY

According to aspects of the disclosure, an electronic device is provided, comprising: a rotary input module; a display; a memory; and at least one processor operatively coupled to the memory, configured to: detect a rotary input via the rotary input module; generate second information associated a first information that is displayed on the display; display the first information and the second information on the display; and change at least some of the first information and the second information based on the rotary input, and display the same.

According to aspects of the disclosure, a method is provided for use in an electronic device having a rotary input module and a display, the method comprising: detecting a rotary input via the rotary input module; generating second information associated a first information that is displayed on the display; displaying the first information and the second information on the display; and changing at least some of the first information and the second information based on the rotary input, and displaying the same.

According to aspects of the disclosure, a non-transitory computer-readable medium is provided that stores one or more processor-executable instructions, which when executed by at least one processor, cause the at least one processor to perform a method comprising the steps of: detecting a rotary input via a rotary input module; generating second information associated a first information that is displayed on a display; displaying the first information and the second information on the display; and changing at least some of the first information and the second information based on the rotary input, and displaying the same.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
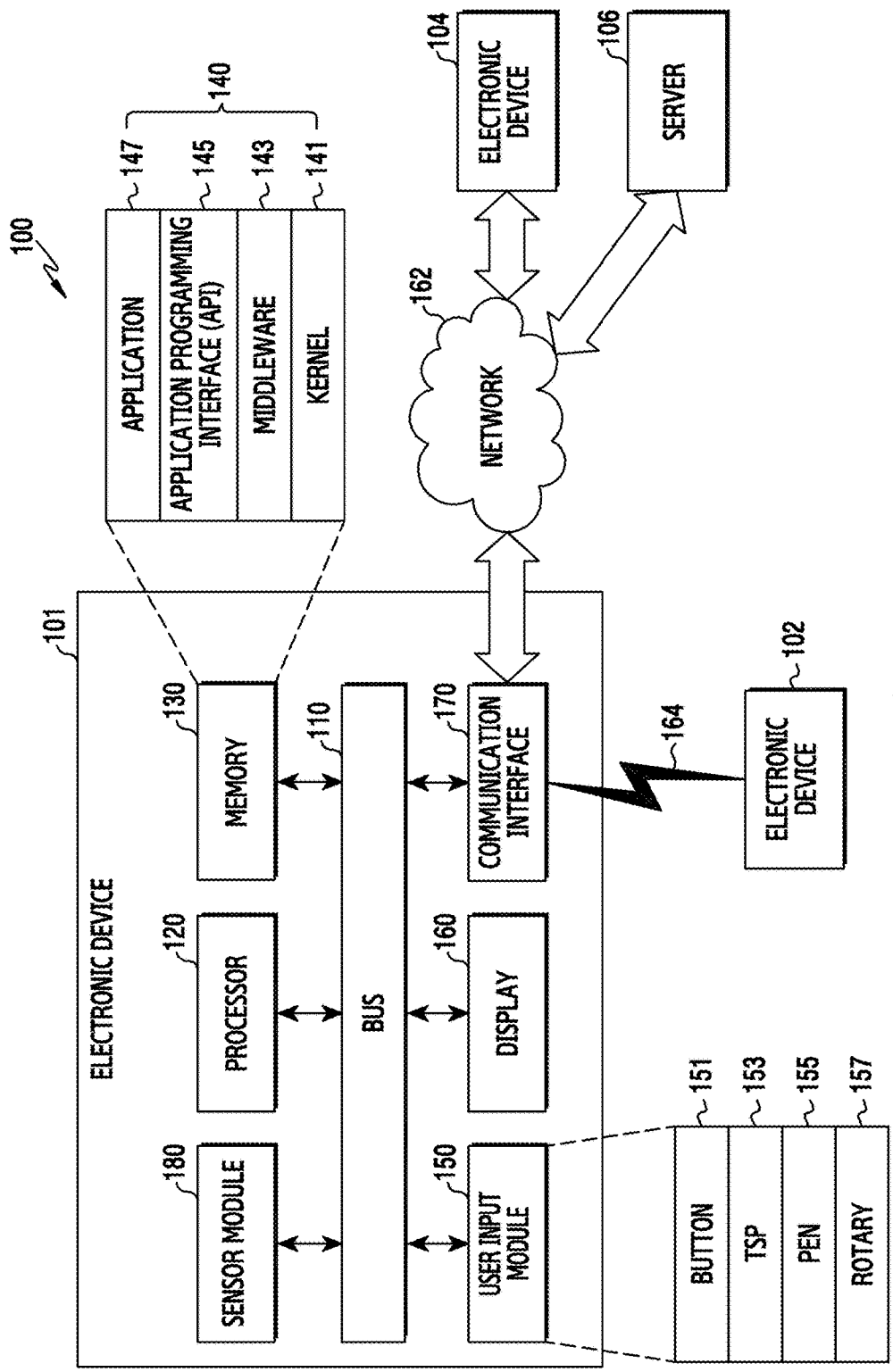
FIG. 1 is a diagram of an example of an electronic device in a network environment according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B. The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram of an example of an electronic device in a network environment according to various embodiments of the present disclosure. An electronic device 101 within a network environment 100, according to various embodiments, will be described with reference to FIG. 1. The electronic device 101 may include a bus 110, a processor 120, a memory 130, a user input module 150, a display 160, a communication interface 170 and sensor module 180. According to an embodiment of the present disclosure, the electronic device 101 may omit at least one of the above components or may further include other components.

The bus 110 may include, for example, a circuit which interconnects the components 110 to 180 and delivers a communication (e.g., a control message and/or data) between the components 110 to 180.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. For example, the processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

A processor 120 executes a function corresponding to a user input signal when the user input signal is received from a user input module 150. For example, the user input signal is a detected signal that is transferred from a rotary 157, and the processor 120 determines that a rotary input is detected when the detected signal is received. The processor 120 generates a second information associated with a first information that is displayed in the display 160, based on the rotary input. The second information may include information that is directly or indirectly associated with the first information, and at least one piece of second information may be generated. The first information is main information, and the second information may be regarded as additional information. For example, the first information is a list of applications, and the second information may be an application that is registered in a bookmark and/or a frequently used application. The processor 120 may display the first information and the second information in the display 160. The processor 120 may execute a control to display the first information in a portion of the display 160, and to display the second information in a portion of the display 160, such that it overlaps the area where the first information is displayed.

For example, a single application is a single object, and may be displayed in the form of an icon. The first information includes five objects (e.g., an icon of a first application to an icon of a fifth application), and a selection indicator may be located on one (e.g., an icon of the first application) of the five objects. The selection indicator indicates a selected object, and may be displayed to be distinguished from another object that is not selected. The object where the selection indicator is located may be highlighted, may be enlarged than other objects, or may be expressed in bold. The second information includes three objects (e.g., icons of a fifth application, a seventh application, and an eighth application) that are registered in a bookmark, that are recently used, or that are frequently used, and a selection indicator may be located on one (e.g., the icon of the fifth application) of the objects.

The processor 120 may change the first information and the second information based on the rotary input, and may display the same in the display 160. For example, the first information that is changed and displayed may show that the selection indicator is shifted to another object (e.g., from the icon of the first application to the icon of the second application). The second information that is changed and displayed may show that the selection indicator is shifted to another object (e.g., from the icon of the third application to the icon of the fifth application). The quantities or the speeds of changing the first information and the second information may be identical to, or different from each other. The quantities or speeds of changing the first information and the second may be set to a default to the electronic device 101, or may be set by a user.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The user input module 150, for example, may function as an interface that may transfer commands or data input from a user or another external device to the other element(s) of the electronic device 101. Furthermore, the user input module 150 may output the commands or data received from the other element(s) of the electronic device 101 to the user or another external device. For example, the user input module 150 may comprise button 151, touch screen panel (TSP) 153, pen 155, rotary 157.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication. The short-range communication may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

The sensor module 180, for example, may measure a physical quantity or may sense an operation state of the electronic device 101, and may convert the measured or sensed information into an electric signal. The sensor module 180, for example, may include at least one of a gesture sensor, a gyro sensor, an atmospheric pressure sensor, a magnetic sensor, an acceleration sensor, a grip sensor, a proximity sensor, a color sensor (e.g., Red, Green, Blue (RGB) sensor), a biometric sensor, a temperature/humidity sensor, illuminance sensor, and Ultra Violet (UV) sensor.

Figure 2:
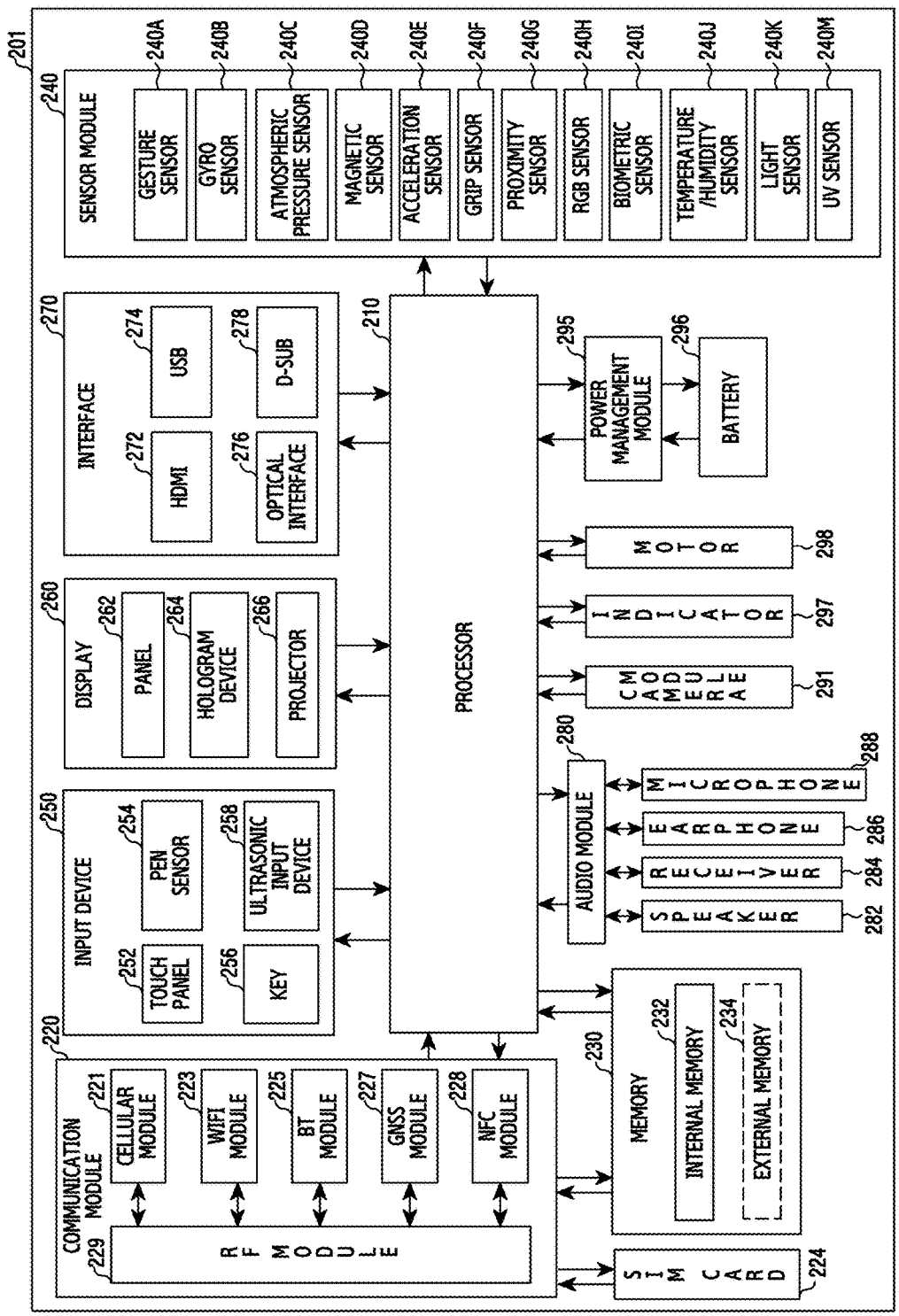
FIG. 2 is a block diagram of an example of an electronic device, according to various embodiments of the present disclosure.

FIG. 2 is a block diagram of an example of an electronic device, according to various embodiments of the present disclosure.

The electronic device 201 may include, for example, all or a part of the electronic device 101 shown in FIG. 1. The electronic device 201 may include one or more processors 210 (e.g., Application Processors (AP)), a communication module 220, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using a subscriber identification module (e.g: SIM card) 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
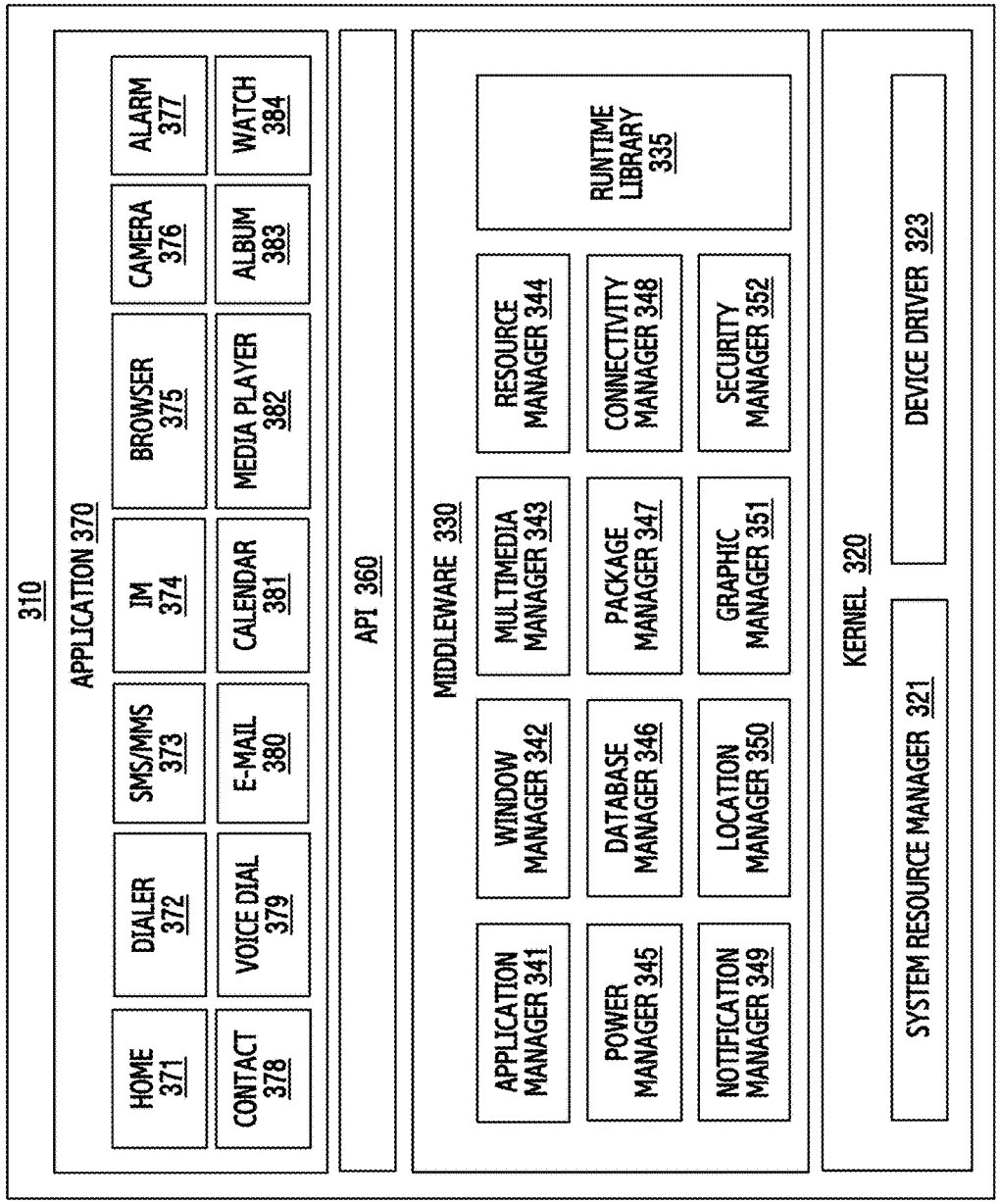
FIG. 3 is a block diagram of an example of a program module, according to various embodiments of the present disclosure.

FIG. 3 is a block diagram of an example of a program module, according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

In the case of a wrist watch-type electronic device, a rotatable rotary is disposed in the exterior of the electronic device, and by rotating the rotary, a menu or an item that is displayed in a display unit of the electronic device may be shifted. In the case in which shifting an item is executed by rotating the rotary, when the number of items increases, the rotary is repeatedly rotated many times.

Various embodiments of the present disclosure may provide a method and an apparatus for providing originally provided information together with additional information based on a rotary input.

Figure 4A:
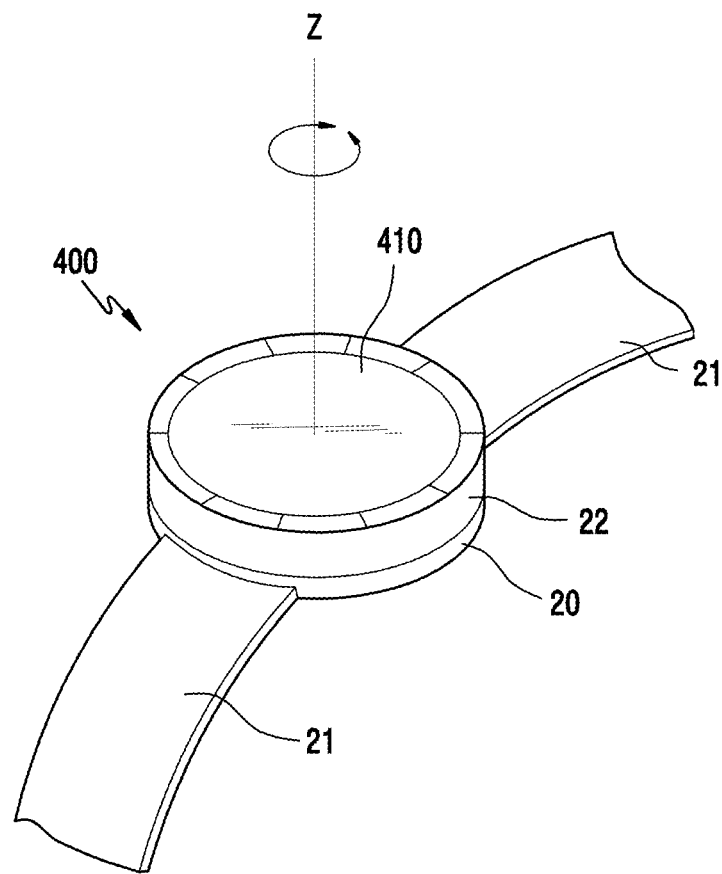
FIG. 4A is a diagram of an example of an electronic device, according to various embodiments of the present disclosure.
Figure 4B:
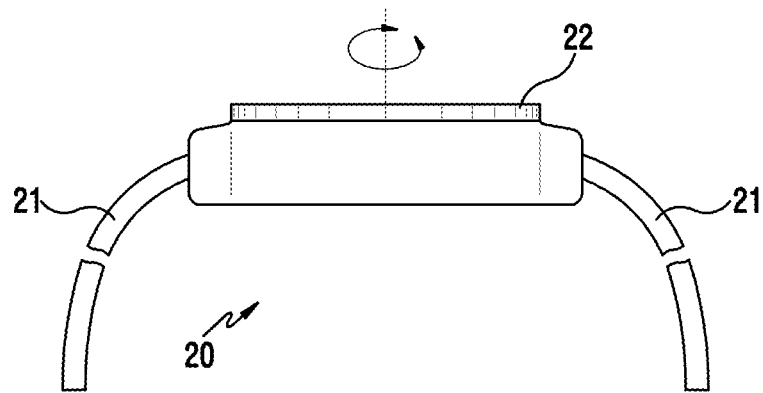
FIG. 4B is a diagram of an example of an electronic device, according to various embodiments of the present disclosure.

FIGS. 4A-B are diagrams illustrating an example of an electronic device, according to various embodiments of the present disclosure.

FIG. 4A is a perspective view of an electronic device. Referring to FIG. 4A, an electronic device 400 may be a wrist wearable device (e.g., a smartwatch) that can be worn on a wrist of a user. According to various embodiments of the present disclosure, the electronic device 400 may include a housing 20 and a connecting unit (e.g., a strap) 21 that is mounted on the housing 20. According to various embodiments of the present disclosure, the electronic device 400 may include a battery (e.g., a chargeable battery and the like), as an internal power supplying unit. The electronic device 400 is selectively mounted on a portable charging cradle, and may be embodied to charge a battery.

According to various embodiments of the present disclosure, the housing 20 may include a display 410 and/or at least one key button (not illustrated). The display 410 may include a touch screen, and may receive a touch input. In one side of the housing 20, a rotary input module 22 that enables rotation may be disposed. Although the drawing illustrates the housing 20 as having a cylindrical shape, the housing 20 may have various shapes (e.g., a rectangular shape, a polygonal shape, and the like). According to various embodiments of the present disclosure, like the rotary 157 of FIG. 1, the rotary input module 22 may be disposed in a bezel that encloses the edge of the display 410 that is disposed on the top of the housing 20. Alternatively, the rotary input module 22 may be disposed on the lateral side of the housing 20, like a stem of a watch. The rotary input module 22 may or may not be flush with the rest of the housing. According to various embodiments of the present disclosure, the rotary input module 22 may rotate on z-axis clockwise or counterclockwise. The amount of rotation may be limited to a predetermined value (e.g., 360 degrees) or the rotary input module 22 may be configured to rotate unlimitedly.

According to various embodiments of the present disclosure, when a user rotates the rotary input module 22, the electronic device 400 may execute various functions based on a rotary parameter of the rotary input module 22. For example, the electronic device 400 may detect a rotary parameter of the rotary input module 22 by using a plurality of rotary recognizing units. For example, the plurality of rotary recognizing units may include: an optical sensor that detects a rotary parameter by recognizing an optical pattern of the rotary input module 22; a sensor that detects a rotary parameter by sensing the magnetic force of a magnet contained in the rotary input module 22; or other sensors that are capable of detecting a rotary input such as a hall sensor and the like. Here, the rotary parameter may include at least one of a rotation direction of a body of rotation, a rotation speed, an amount of rotation, and a location after rotation.

FIG. 4B illustrates a lateral view of an electronic device. Referring to FIG. 4B, the electronic device 400 may be worn on a wrist in a manner of winding the connecting unit 21 on the wrist when the housing 20 is put on the wrist. For example, the connecting unit 21 may include a plurality of opening parts (not illustrated) disposed at regular intervals, through which a wearing position is adjusted to fit the wrist of a user. According to various embodiments of the present disclosure, the connecting unit 21 may be formed of at least one material from among metal, leather, rubber, silicon, and urethane. The connecting unit 21 may be worn on any suitable body part, such as, a neck, an ankle, a wrist, or the like, according to various embodiments of the present disclosure.

According to various embodiments of the present disclosure, an electronic device may include a rotary input module, a display, a memory, and a processor that is coupled with the memory. The processor is configured to: detect a rotary input of the rotary input module; generate second information associated with first information that is displayed on the display; display the first information and the second information in the display; and change at least some of the first information and the second information based on the rotary input, and display the same.

The rotary input module may be disposed in one side of a housing of the electronic device, and may perform rotation.

The processor may move a selection indicator located in an object that is included in the first information or the second information, and display the same.

The second information includes at least one out of: at least some of the first information; information obtained or generated based on at least some of the first information; and information designated by a user.

The second information includes at least one out of: some of the first information; at least some of an object before or after an object that is displayed on the display as the first information; an object of which an index is arranged to be different from the first information; an object that is frequently used among objects included in the first information; an object that is recently used among the objects included in the first information; an object that is registered in a bookmark among the objects included in the first information; and an object that is associated with property information of the first information or hardware. The first information is displayed in at least a portion of the display, and the second information is displayed in at least a portion of the display, and is displayed in the portion where the first information is displayed.

The processor is configured to execute a control: to separate a display area of the display into a first area and a second area, to display the first information in the first area, and to display second information in the second area.

The processor is configured to set at least one of a type, the number of pieces, a location, a size, an area, a color, and a display method in association with the second information.

Quantities or speeds of changing, based on the rotary input, the first information and the second information may be identical to, or different from each other.

The processor is configured to switch display locations of the first information and the second information when the second information is selected.

The processor may store or scan the displayed first information and/or the second information when a predetermined user input is detected.

Figure 5:
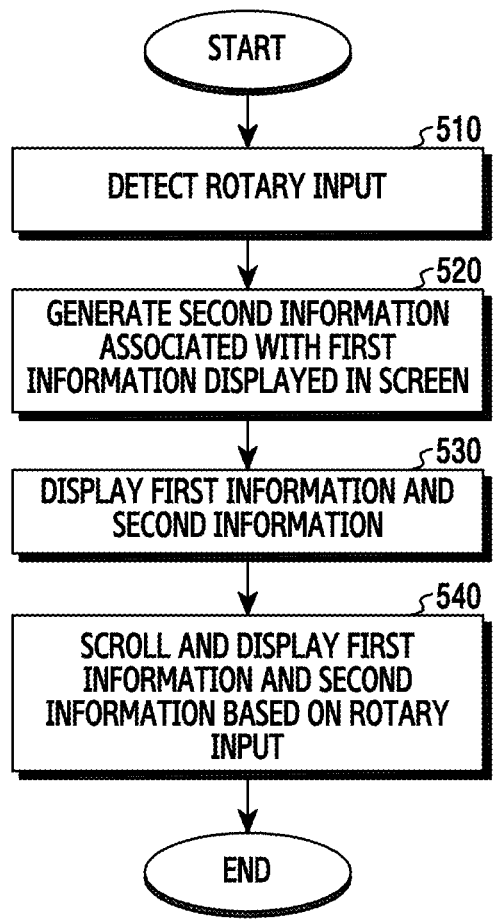
FIG. 5 is a flowchart of an example of a process, according to various embodiments of the present disclosure.

FIG. 5 is a flowchart of an example of a process, according to various embodiments of the present disclosure.

Referring to FIG. 5, in operation 510, the processor 120 detects a rotary input. The processor 120 may detect the rotary input when the display 160 of the electronic device 101 is turned on or off. For example, when a detected signal is received from the rotary 157, which is a type of user input module 150 or from the rotary input module 22, the processor 120 may determine that a rotary input is detected.

In operation 520, the processor 120 generates second information associated with first information that is currently displayed on the display 160 (or display 410). The first information may be any suitable type of menu, image (or another graphical object) that is currently displayed on the screen of the display 160. The second information may include at least one out of: at least some of the first information; information obtained or generated based on at least some of the first information; and information designated by a user. According to various embodiments of the present disclosure, the second information may be at least one out of: some of the first information that is not displayed on a display 160; at least some of an object that is before or after an object that is currently included in the first information; an object of which an index is arranged to be different from the first information; an object that is frequently used from among objects included in the first information; an object that is recently used from among the objects included in the first information; an object that is registered in a bookmark from among the objects included in the first information; and an object that is related to property information of the first information or hardware.

When an excessive number of objects of the first information exist (a number that is greater than a predetermined threshold), it is difficult to display all of the objects included in the first information in one screen, and it is difficult to scroll many of the objects included in the first information using a single rotary input (e.g., 1 to 45 degrees), and thus, the processor 120 may generate some of the objects included in the first information as the second information. In this instance, the second information may include a portion of the first information that is not displayed on the display 160. For example, when a total of 100 objects are arranged based on a predetermined order as the first information, the first information may include the $1^{st}$ to $50^{th}$ objects, and the second information may include the $51^{st}$ to $100^{th}$ objects. Alternatively, when the first information that is displayed on the display 160 at a time is $1^{st}$ to $5^{th}$ objects, the second information may include $6^{th}$ to $8^{th}$ objects. Alternatively, the processor 120 may generate $6^{th}$ to $8^{th}$ objects and $51^{st}$ to $60^{th}$ objects as the second information.

In operation 530, the processor 120 displays the first information and the second information on the display 160. The processor 120 may o display the first information in at least a portion of the display 160, and the second information in a portion of the display 160; that is, to display the second information in the portion where the first information is displayed. For example, the second information may be displayed on the edge of the first information, or may be displayed superimposed on the first information. The first information may include 5 objects, and the second information may include 3 objects. The number of objects in the first information may be the same or different from the number of objects in the second information.

A selection indicator may be located in the first object out of the objects included in the first information and the second information. The selection indicator indicates a selected object, and the object may be displayed to be distinguished from another object that is not selected. For example, a first object where the selection indicator is located may be highlighted, may be enlarged more than other objects, or may be expressed in bold. In the first information and the second information, the order of objects where the selection indicator is located may be identical to, or different from each other. For example, the selection indicator may be located on a first object in both the first information and the second information. Alternatively, the selection indicator may be located on a first object in the first information, and the selection indicator may be located on a second object in the second information.

According to various embodiments of the present disclosure, immediately after detecting the rotary input, the processor 120 may variously set a point in time when the second information is displayed, such as after the selection indicator is moved, after a predetermined period of time elapses, and the like.

In operation 540, the processor 120 changes the first information and the second information based on the rotary input, and displays the same on the display 160. According to various embodiments of the present disclosure, the processor 120 may change the first information and the second information in a similar or identical speed or different speeds based on a rotation ratio determined based on the number of objects included in the first information and the number of objects included in the second information, and may display the first information and the second information in proportion to the speed of changing.

For example, the first information that is displayed after changing may correspond to the case in which the selection indicator is shifted from a first object to a second object. The second information that is displayed after changing may correspond to the case in which the selection indicator is shifted from a second object to a third object. According to various embodiments of the present disclosure, the quantities or speeds of changing of the first information and the second information may be identical to, or different from each other. For example, the quantity or speed of changing may indicate the number of objects that a single rotary input shifts. A single rotary input may equally shift objects included in the first information and the second information by one or two. Alternatively, a single rotary input may shift the objects included in the first information by one, and may shift the objects included in the second information by two. Alternatively, a single rotary input may shift the objects included in the first information by one, and two rotary inputs, as opposed to a single rotary input, may shift the objects included in the second information by one. The quantities or speeds of changing the first information and the second information may be set as default to the electronic device 101, or may be set by a user.

According to various embodiments of the present disclosure, when the direction of the rotary input is a clockwise direction, the processor 120 may change the direction of the shift of the objects in the first information and the second information, to the clockwise direction, and may display the same. When the direction of the rotary input is the counter-clockwise direction, the processor 120 may change the direction of the shift of the objects in the first information and the second information to the counter-clockwise direction, and may display the same. Alternatively, when a rotary input is provided clockwise and a rotary input is provided counter-clockwise, the processor 120 may rotate the first information and the second information again to an original location, and may display the same.

According to various embodiments of the present disclosure, when a rotary input provided in a direction opposite to a rotation direction detected in operation 510 is detected, the processor 120 may hide the second information on the display 160. That is, the processor 120 may no longer display the second information that has been displayed in operations 530 and 540, and may remove the second information.

According to various embodiments of the present disclosure, when the electronic device 101 has an accessibility talk-back function, and the talk-back function is turned on, the processor 120 may hide the second information. Alternatively, when the processor 120 operates to display the second information, the processor 120 may output a voice message associated with the first information, and then, may output a voice message associated with the second information. Alternatively, the processor 120 may output a voice message associated with the second information, and may then output a voice message associated with the first information. The talk-back function is a service that provides a voice associated with the content displayed on a screen, as if to read writing to a user who cannot read the screen. That is, the talk-back function is a function of reading the content that is displayed on the display 160 or selected by a user.

According to various embodiments of the present disclosure, when the electronic device 101 is connected to another device (e.g., the electronic device 104), the electronic device 104 may also display the second information. The processor 120 may transmit, to the electronic device 104, the second information through the communication interface 170. In this instance, the second information may be displayed on both the electronic device 101 and the electronic device 104, or may be displayed on only the electronic device 104. The second information may be displayed on the electronic device 101 and the electronic device 104, simultaneously or at intervals. According to various embodiments of the present disclosure, when the electronic device 101 is connected to an external rotary input device, the processor 120 may execute the operations (operations 510 to 540) based on a rotary input of the external rotary input device.

According to various embodiments of the present disclosure, the external rotary input device may be the wrist wearable device (e.g., a smartwatch) that is illustrated in FIGS. 4A and 4B. The processor 120 may control the external rotary input device to display the second information. The processor 120 may transmit, to the external rotary input device, the second information through the communication interface 170. In this instance, the second information may be displayed on both the display 160 and the external rotary input device, or may be displayed in only the external rotary input device.

Figure 6A:
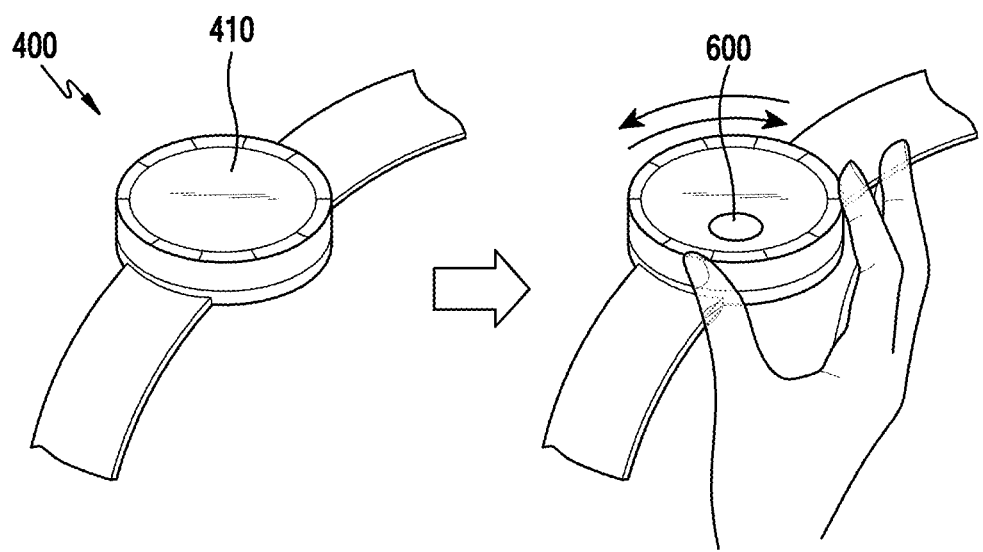
FIG. 6A is a diagram illustrating the operation of an electronic device, according to various embodiments of the present disclosure.

FIG. 6A is a diagram illustrating the operation of an electronic device, according to various embodiments of the present disclosure. As illustrated, the electronic device 400 may display a first information on the display 410. The first information may be displayed in at least a portion of the display 410. The electronic device 400 may display a second information associated with the first information when a counter-clockwise or clockwise rotary input is detected. The second information may be superimposed on the first information, as illustrated in the diagram 600.

Figure 6B:
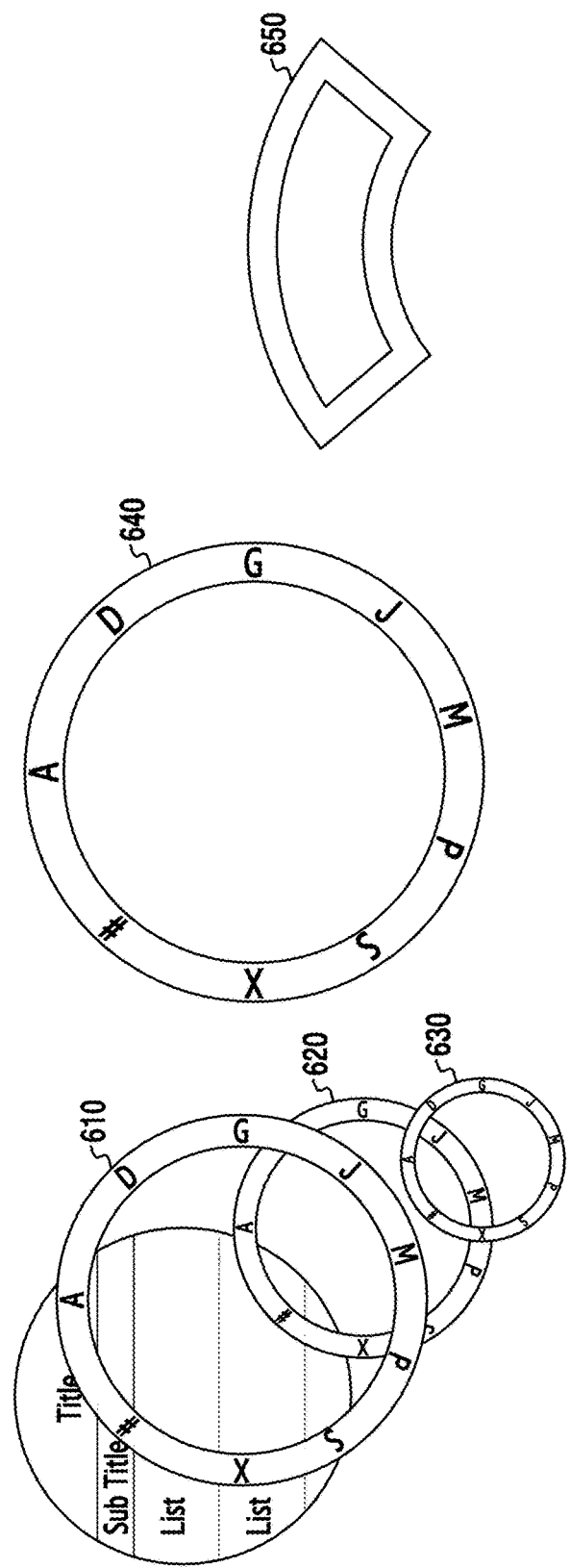
FIG. 6B is a diagram of an example of a user interface, according to various embodiments of the present disclosure.

FIG. 6B is a diagram of an example of a user interface, according to various embodiments of the present disclosure. As illustrated, the second information may be displayed in various forms. When the electronic device 400 has a circular shape, the second information may be displayed in the form of a circular shape to be identical or similar to the form of the electronic device 400, as illustrated in the diagram 610. The second information may be displayed in the form of a circular shape that is smaller than the diameter of the display 410, as illustrated in the diagram 620. The second information may be displayed in the form of a circular shape that is smaller than the diagram 620, as illustrated in the diagram 630. Alternatively, the second information may be displayed on the edge of the first information and it may have a circular shape with a diameter that is larger than the diameter of the display 410, as illustrated in the diagram 640. The second information may have a polygonal shape, irrespective of the form of the electronic device 400, as illustrated in the diagram 650.

According to various embodiments of the present disclosure, the second information may be displayed to, or not to, overlap the first information. For example, the second information may be superimposed on the first information, may be displayed on the edge of the first information, or may be displayed in an area that does not overlap the first information. The processor 120 may separate the entire area of the display 160 into a first area and a second area, and may display the first information in the first area and display the second information in the second area. The size of the first area and the size of the second area may be identical to, or different from each other. The first area may be larger or smaller than the second area.

According to various embodiments of the present disclosure, the second information may include information that is directly or indirectly associated with the first information. For example, the second information may be at least one out of: an object of which an index is separated from the first information; an object of which an index is arranged to be different from the first information; an object that is frequently used from among objects included in the first information; an object that is recently used from among objects included in the first information; an object that is registered in a bookmark from among objects included in the first information; and an object that is related to property information of the first information and hardware. There are various embodiments in association with generating second information. Hereinafter, an example of generating second information will be briefly described with reference to Table 1.

TABLE 1

| Classification | First information | Second information |
| --- | --- | --- |
| Home screen | Application list | Hardware-related information |
| | | Frequently used application |
| | | Recently used application |
| | | Application registered in a bookmark |
| | | Property information associated with selected application |
| | | Recently installed application |
| | | Application of related category |
| Contact number | Contact number list | Frequently used contact number |
| | | Recently used contact number |
| | | Contact number registered in bookmark |
| | | Contact number of which an index is separated from first information |
| | | Contact number of which an index is classified to be different from first information |
| | | Property information of selected contact number |
| | | emergency contact number |
| Music | Music list | Music list of which indices are separated |

TABLE 1-continued

| Classification | First information | Second information |
|---|---|---|
| | | from first information |
| | | Music list of which indices are classified to be different from first information |
| | | Frequently listened music |
| | | Recently listened music |
| | | Music registered in bookmark |
| | | Music list associated with selected music |
| | | Artist list associated with selected music |
| | | Property information associated with selected music |
| Morning call | Time for first morning call | Time for second morning call |
| | | Property information of first morning call |
| Gallery | Image list | Location list |
| | | Person list |
| | | Property information associated with selected image |
| | | Image before or after selected image |
| Weather | Hourly or daily weather | Image associated with weather |
| | | Weather before or after selected time or date |
| | | Location list |

Table 1 indicates that second information may be variously generated based on first information when the first information is determined based on the classification displayed in the current display 410. The home screen indicates a background screen of the display 410 or a screen that does not execute anything after providing power to the electronic device 400. When the 'home screen' is displayed on the display 410, the processor 120 may display an application list (e.g., settings, a memo, a camera) in the display 410 as first information. In this instance, the processor 120 may generate, as second information, at least one out of: hardware-related information (e.g., a volume control, a screen brightness control, a Wi-Fi connection, a connected or retrieved device, or the like); a frequently used application (e.g., a message, a call, or a messenger); a recently used application (e.g., a game, a messenger, or a call); an application that is registered in a bookmark (e.g., a game or a messenger); property information associated with a selected application (e.g., settings, a version, or a size); a recently installed application; and an application in a related category.

According to various embodiments of the present disclosure, when the 'contact' application is executed, the processor 120 may display a contact number list (e.g., Kim eul-dong and Kim young-hee) in the display 410 as a first information. In this instance, the processor 120 may generate, as a second information, at least one out of: a frequently used contact number (e.g., Park na-rae, Jang dong-gun, and Choi ji-woo); a recently used contact number (e.g., 1588-0000 and 010-1234-5678); a contact number registered in an address book (e.g., Kim young-hee, Jang dong-gun, and Hong gil-dong); a contact number of which an index is separated from the first information (e.g., Hong gil-dong and Hong myung-bo); a contact number of which an index is classified to be different from the first information (e.g., Amie, James, and Mark); property information of a selected contact number (e.g., an image, an e-mail, and a birthday); and an emergency contact number.

According to various embodiments of the present disclosure, when the 'music' application is executed, the processor 120 may display a music list (e.g., a first rank music, a second rank music, and a third rank music) in the display 410 as first information. In this instance, the processor 120 may generate, as second information, at least one out of: a list of music of which indices are separated from the first information (e.g., a $51^{st}$ rank music, a $52^{nd}$ rank music, and a $53^{rd}$ rank music); a list of music of which indices are classified to be different from the first information (e.g., Addicted, Bring him home, and Call me baby); a frequently listened to music (e.g., a $96^{th}$ rank music, a $3^{rd}$ rank music, and a $5^{th}$ rank music); a recently listened to music (e.g., a $1^{st}$ rank music to a $5^{th}$ rank music); a music registered in a bookmark (e.g., Call me baby, a $3^{rd}$ rank music, and a $5^{th}$ rank music); a list of music associated with a selected music (e.g., another music of the same artist); a list of artists associated with a selected music (e.g., Miss A and SNSD); and property information associated with a selected music (e.g., an image, a size, and a time).

According to various embodiments of the present disclosure, when the 'morning call' application is executed, the processor 120 may display the time for the first morning call (e.g., 6:00 AM) on the display 410 as a first information. In this instance, the processor 120 may generate, as a second information, at least one out of: the time for the second morning call (e.g., 6:35 AM) and property information of the first morning call (e.g., a sound, a repetition, and reinforming).

According to various embodiments of the present disclosure, when the 'gallery' application is executed, the processor 120 may display an image list (e.g., image 1, image 2, and image 3) on the display 410 as a first information. In this instance, the processor 120 may generate, as second information, at least one out of: a location list (e.g., Seoul, Incheon, and Chicago); a person list (e.g., My love, Jack, and Mike); property information associated with a selected image (e.g., a photographing date, a location, and a size); and an image before or after a selected image (e.g., image 1 or image 2). The property information may include a photographing date, a location, and a size in association with a selected image, and may also include tag information of the image selected from the first information or tag information associated with an image associated with the selected image. The second information may be generated by using various types of information, such as tag information and/or information obtained as a result of performing image analysis.

According to various embodiments of the present disclosure, when the 'weather' application is executed, the processor 120 may display hourly or daily weather information (e.g., weather at 6:00 AM to 3:00 PM or weather in Thursday through Tuesday) on the display 410 as a first information. In this instance, the processor 120 may generate, as a second information, at least one out of: an image associated with weather (e.g., an image of the sun when it is sunny and an image of a cloud when it is cloudy); and weather before or after a selected hour or date (e.g., weather at 5 AM and weather at 4 PM).

According to various embodiments of the present disclosure, the processor 120 may generate the second information based on at least one of: a feature of the first information displayed on the display 160; a condition determined in advance in the electronic device 101; and settings made by a user. The predetermined condition may indicate generating hardware-related information as the second information, irrespective of the content currently displayed on the display 160. Hereinafter, although an example of generating second information will be described with reference to the drawing, the present disclosure may not be limited thereto.

Figure 7A:
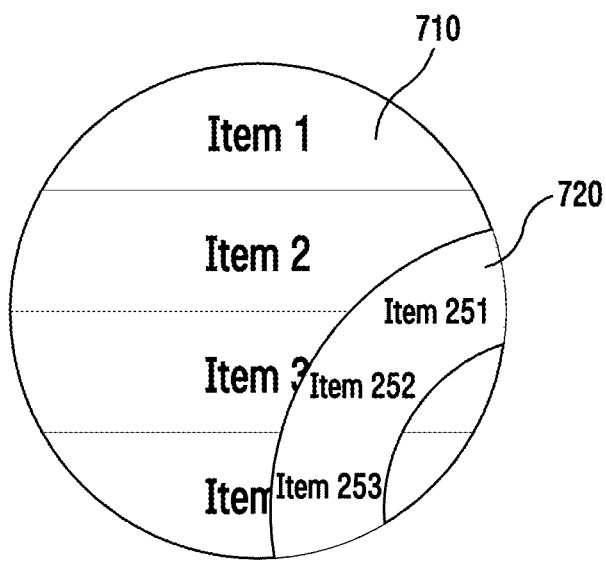
FIG. 7A is a diagram of an example of a user interface, according to various embodiments of the present disclosure.
Figure 7B:
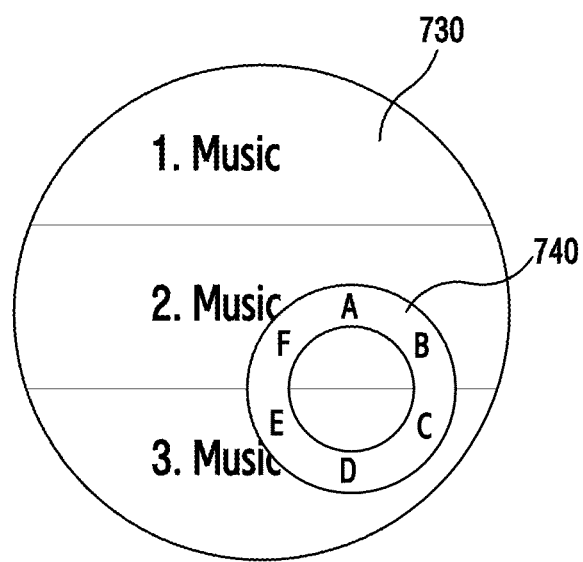
FIG. 7B is a diagram of an example of a user interface, according to various embodiments of the present disclosure.

FIGS. 7A-B are diagrams illustrating different examples of user interfaces, according to various embodiments of the present disclosure.

FIG. 7A illustrates an example of providing a second information in an item list providing screen (a screen that provides a list of a plurality of items, for example, a screen where 'contact number', 'music', 'video' applications are executed). Referring to FIG. 7A, a first information 710 is an item list (e.g., a contact number list, a video list, a music list, and the like), and the second information 720 may include at least one object that is part of the first information 710 (that is, some of the first information that is not displayed on the display 410). According to the present example, one item that is included in the item list may be understood as a single object.

For example, when a total of 500 objects are included in the first information 710, the processor 120 may generate the second information 720 by classifying indices of the first information 710. The processor 120 may include objects of indices 1 to 250 as the first information 710, and may generate the objects of indices 251 to 500 from the first information 710 as the second information 720. Therefore, the display 160 may display the objects 1-4 in the first information 710, and may display objects 251-253 in the portion of second information 720. When the number of objects included in the first information exceeds a predetermined number (e.g., 50 or 100), the processor 120 may include some of the available objects in second information. The predetermined number may be set by the electronic device 101 or may be set by a user. The processor 120 may include some of the first information in second information or third information. In some implementations, a third information may be generated in addition to the second information. A discussion of the third information is provided further below.

Conventionally, to access the 270$^{th}$ item, multiple rotations were required (e.g., 20 or more times), which was a drawback. However, when the indices are separated, 1 to 250 indices rotate in the first information 710 and 251 to 500 indices rotate in the second information 720. Accordingly, based on the 251$^{st}$ object of the second information 720, a shift to the 270$^{th}$ object or an adjacent object may be readily performed. In association with a method of accessing the second information 720, a selecting operation that touches an object included in the second information 720 may switch the display locations of the first information 710 and the second information 720. Switching the display locations will be described in detail with reference to FIG. 14.

FIG. 7B illustrates an example of providing a second information in a 'music' application. Referring to FIG. 7B, a first information 730 is a music list, and a second information 740 is some of the first information 730; that is, a list of music of which indices are arranged to be different from the first information 730. In the case of the music list, indices are arranged based on text included in the titles of music; for example, numbers, alphabet, language for each nation. Numbers are arranged in order of 1, 2, and 3, and alphabet letters are arranged in order of a, b, and c, and languages of nations are arranged in ascending order defined for each nation, such as alphabetically. For example, Han-geul is arranged in order of consonants 'ㄱ' (an order corresponding to the alphabet 'a'), 'ㄴ' (an order corresponding to the alphabet 'b'), and 'ㄷ' (an order corresponding to the alphabet 'c'). Alternatively, the music list may be arranged in descending order.

According to various embodiments of the present disclosure, the processor 120 may include in the first information 730 objects that are arranged in numerical order, and may generate, a second information 740 which includes objects arranged in alphabetical order. Therefore, the display 160 may display objects corresponding to the numbers 1 to 3 as the first information 730, and may include objects corresponding to the letters A-F in the second information 740. The number of objects included in the first information 730 may be the same or different from the number of objects included in the second information 740. Based on whether the number of objects is identical to, or different from each other, the number of objects that are changed based on a single rotary input may be identical to, or different from each other. The number of objects displayed in the first information 730 and the second information 740 or the number of objects that are changed based on a single rotary input, may be changed based on a condition set in advance in the electronic device 101 or based on a user's settings.

According to embodiments of the present disclosure, when a total of 300 objects are included in the first information 730, indices are preferentially displayed, out of number, English, and Hangeul indices, based on a mainly used language or the number of music contents in a list. For example, when a large number of music content including Hangeul exist in the music list, indices are displayed from 'ㄱ' (corresponding to the letter 'a') to 'ㅎ' (corresponding to the letter 'z'), and then from A to Z. Conventionally, when a user desires to search for music having a title beginning with T (e.g., Tomorrow), the indices of the first information 730 may be arranged based on Han-geul first, and thus, the user needs to enter A after the indices arranged based on Han-geul, and executes rotation several times so as to search for the music having the title starting with T, which is a drawback. From the perspective of the drawback, the processor 120 may generate the second information 740 by separating the indices from the first information 730. Although FIG. 7B illustrates an example in which the objects in the first information 730 are displayed in numerical order and the objects in the second information 740 are displayed in an alphabetical order, the first information 730 may be a music list arranged by using Han-geul as indices and the second information 740 may be a music list arranged by using alphabet as indices.

FIGS. 8A-D are diagrams illustrating different examples of user interfaces, according to various embodiments of the present disclosure.

Figure 8A:
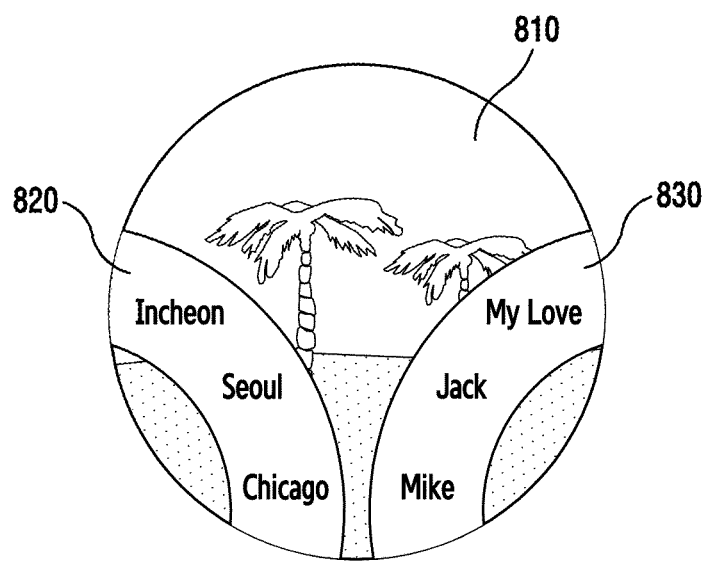
FIG. 8A is a diagram of an example of a user interface, according to various embodiments of the present disclosure.

FIG. 8A illustrates an example that provides a second information in a picture screen (a screen in which a 'gallery' application is executed). Although the descriptions are provided through a picture screen, it is apparent that the present disclosure is not limited to a picture and is applied to various multimedia contents. Referring to FIG. 8A, a first information 810 is at least one image, a second information 820 is a location list (e.g., Incheon, Seoul, and Chicago), and a third information 830 may be a person list (e.g., My Love, Jack, and Mike). The third information 830 may be used to supplement the second information when additional information needs to be displayed. According to various embodiments of the present disclosure, the second information 820 and/or the third information 830 may include information (e.g., an object) that is directly or indirectly associated with the first information 810.

The processor 120 may generate the second information 820 and/or the third information 830 by using the property information (e.g., a tag) of the first information 810. The processor 120 may extract property information, such as a location, a date, a size, and the like, from the first information 810 (e.g., an image displayed on the display 160, an image before the displayed image, and/or an image after the displayed image), and may generate the second information 820 that is arranged based on a 'location' out of the extracted property information. The processor 120 may analyze the extracted property information, and may generate the third information 830 that is arranged based on a 'person' obtained through the analysis. Alternatively, although not illustrated, the processor 120 may generate the second information that is arranged based on a 'date' in order of time that is closest to or farthest from the present time, or that is arranged based on a 'size' in order of the largest size or the smallest size.

Conventionally, when a picture is displayed, pictures are arranged in chronological order. When a picture that is recently captured in Chicago is currently displayed on the display 160, a user needs to execute rotation many times to search for a picture that is captured in Chicago last year. Conversely, when the second information that is arranged based on various indices is provided together with the first information, a user may immediately access a desired picture out of a plurality of pictures, and the number of rotations executed may be reduced.

For example, the user may recognize that the picture captured in Chicago last year exists by viewing the second information 820 while rotating the rotary 157, and may touch the string 'Chicago', that is part of the second information 820. When a user input that touches the string 'Chicago', is detected, the processor 120 may display the picture captured in Chicago last year in a portion of the display 160, and may switch the first information 810 that has been displayed in the portion into the location where the second information 820 is displayed. The user input may include various inputting methods that may be executable by a user, such as a gesture, proximity, hovering, selecting a button, a voice, and the like, in addition to a touch. Alternatively, when the user desires to view a 'My Love' picture by viewing the third information 830 while rotating the rotary 157, the user may touch the string 'My Love' that is part of the third information 830. When a user input that touches the string 'My Love', is detected, the processor 120 may display the My Love picture in a portion of the display 160, and may switch the first information 810 that has been displayed in the portion into the location where the third information 830 is displayed.

Figure 8B:
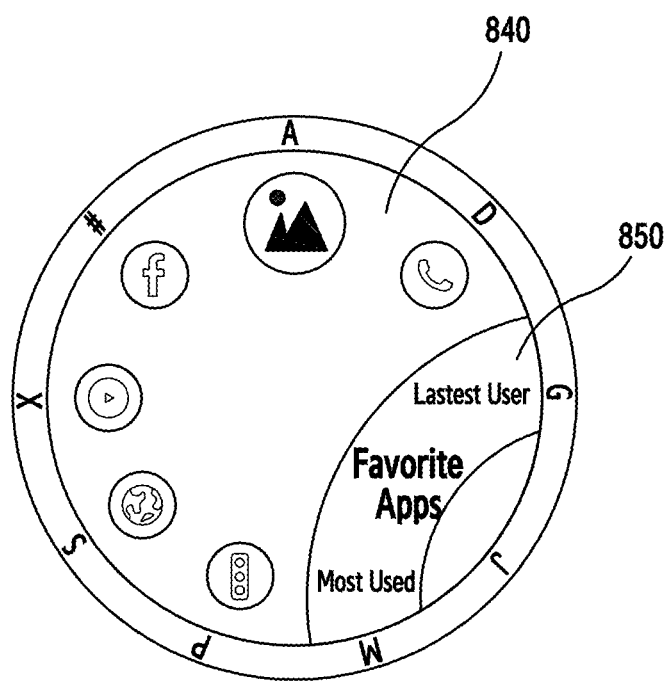
FIG. 8B is a diagram of an example of a user interface, according to various embodiments of the present disclosure.

FIG. 8B illustrates an example that provides a second information on a home screen. Referring to FIG. 8B, a first information 840 corresponds to icons associated with an application list, and a second information 850 corresponds to a name or an icon associated with at least one out of a recently used application (Latest Used Apps), a bookmark application (Favorite Apps), and/or a frequently used application (Most Used Apps).

According to various embodiments of the present disclosure, when the first information 840 that is displayed on the display 160 is an application list, the processor 120 may generate, as the second information 850, an application that is registered in a bookmark by a user, out of the applications installed in the electronic device 101. Alternatively, the processor 120 may generate, as the second information 850, one or more of most frequently used applications by taking into consideration the frequency of use of an application that is used during a predetermined period of time (e.g., a week, a month, or the like). Alternatively, the processor 120 may generate, as the second information 850, a plurality of applications that are used within 24 hours based on the present time, or one application that is most frequently used within 24 hours. The display 160 displays icons associated with 8 applications in a portion of the display as the first information 840, and may display, as the second information 850, information associated with 3 applications onto the portion. In this instance, the icons of some applications of the first information 840 may be hidden by the second information 850, and may not be shown to the user.

Also, although not illustrated, the processor 120 may generate, as second information, hardware-related information (e.g., a volume control, a screen brightness control, a Wi-Fi connection, a connected or retrieved device, and the like) and/or property information (e.g., settings, a version, a size) associated with a selected application.

Figure 8C:
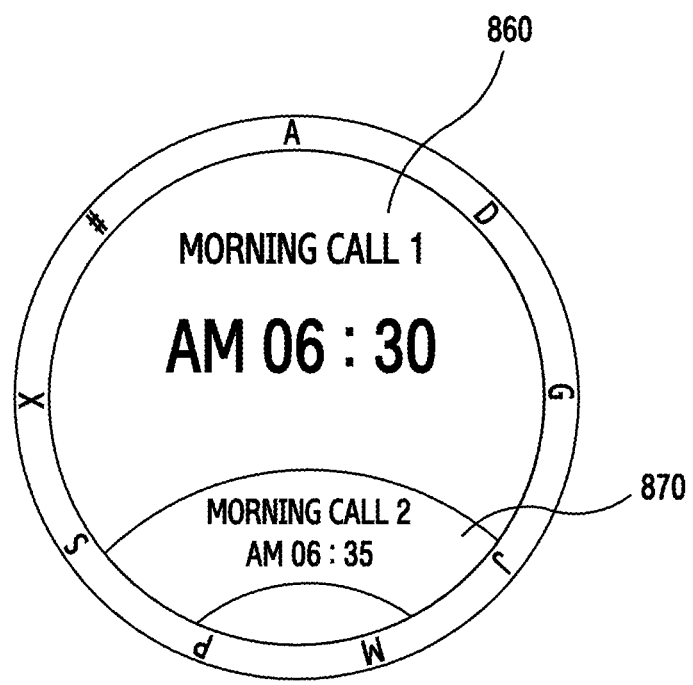
FIG. 8C is a diagram of an example of a user interface, according to various embodiments of the present disclosure.

FIG. 8C illustrates an example that provides a second information in an alarm setting screen (a screen in which a 'morning call' application is executed). Referring to FIG. 8C, a first information 860 may indicate the time for the first morning call (morning call 1 AM 6:30), and a second information 870 may indicate the time for the second morning call (morning call 2AM 6:35). The time for the second morning call may be set to be within a predetermined period of time (e.g., 1 min., 3 min., 5 min., 10 min., and the like) from the time for the first morning call. Based on a rotation input, a time interval (e.g., 1 min., 3 min., 5 min., 10 min., and the like) may be changed. The changed time interval of the time for the first morning call and the changed time interval of the time for the second morning call may be identical to, or different from each other. The range of time and/or the time interval may be set by the electronic device 101, or may be set by a user.

Although not illustrated, the processor 120 may display, as the second information, a predetermined number of alarms, a related schedule, and the like. For example, when a large number of morning calls exists, the second morning call or the fourth morning call may be included in the second information. Also, when the time for the first morning call is included in the first information 860, the second information may correspond to another function associated with time, such as a schedule, a timer, and the like.

Figure 8D:
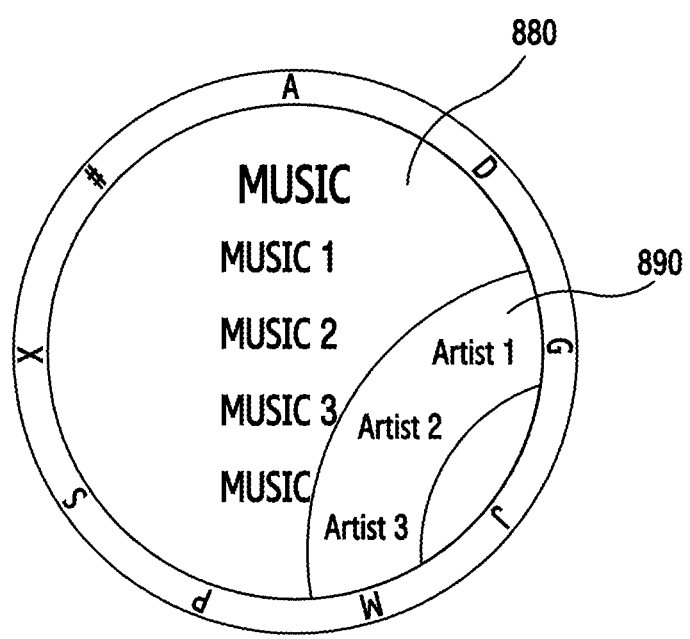
FIG. 8D is a diagram of an example of a user interface, according to various embodiments of the present disclosure.

According to various embodiments of the present disclosure, the processor 120 separates the entire area of the display 160 into a first area and a second area, and executes a control to display the first information 860 in the first area and to display the second information 870 in the second area. Also, although not illustrated, when a large number of alarms exists, the processor 120 may generate the time for the third morning call as the third information, and may generate property information (e.g., a sound, repetition, reinforming) of the first morning call as the second information 870. Alternatively, the processor 120 may generate, as the second information 870, the property information (e.g., a sound, repetition, reinforming) of the first morning call, and may generate, as the third information, the time for the second morning call. FIG. 8D illustrates an example that provides a second information in a music providing screen (a screen in which a 'music' application is executed). Referring to FIG. 8D, a first information 880 may indicate a list of titles of music, and a second information 890 may indicate a list of names of artists (e.g., a singer, a composer, a lyricist, and the like). The processor 120 may extract property information of music (e.g., a singer, a composer, a lyricist, an image, a size, a time, and the like) included in the first information 880, and may generate at least one out of the extracted property information as the second information 890.

Generally, the music list is provided based on the titles or artists (e.g., a singer) of music. When the list is arranged based on the titles of music, indices may be arranged based on text included in the titles of music. When the list is arranged based on artists, indices may be arranged based on the names of artists. However, conventionally, a music list arranged based on the titles of music and a music list arranged based on the names of artists are not shown at a time. Therefore, when a user listens to one music content and desires to search for the artist related to the music content, the user needs to switch the music list arranged based on the titles of music into the music list arranged based on the names of artists, which is inconvenient. From the perspective of the drawback, the processor 120 provides the music list arranged based on the titles of music as the first information 880, and provides the music list arranged based on the names of the artists as the second information 890 in a single screen, thereby improving the convenience of a user.

FIG. 9A-F are diagrams illustrating different techniques for displaying content items, according to various embodiments of the present disclosure.

Figure 9A:
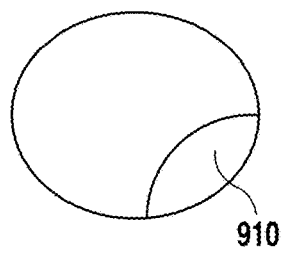
FIG. 9A is a diagram of an example of a technique for displaying content items, according to various embodiments of the present disclosure.
Figure 9B:
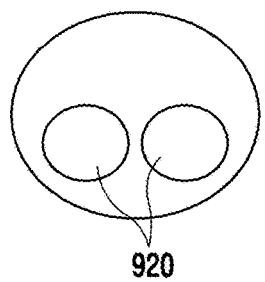
FIG. 9B is a diagram of an example of a technique for displaying content items, according to various embodiments of the present disclosure.
Figure 9C:
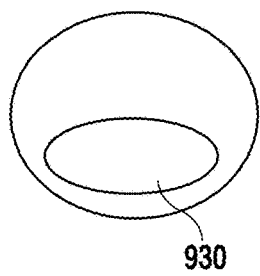
FIG. 9C is a diagram of an example of a technique for displaying content items, according to various embodiments of the present disclosure.
Figure 9D:
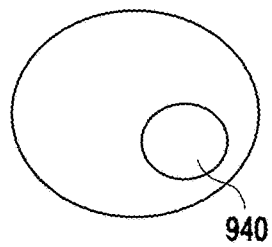
FIG. 9D is a diagram of an example of a technique for displaying content items, according to various embodiments of the present disclosure.
Figure 9E:
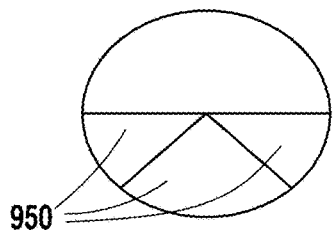
FIG. 9E is a diagram of an example of a technique for displaying content items, according to various embodiments of the present disclosure.
Figure 9F:
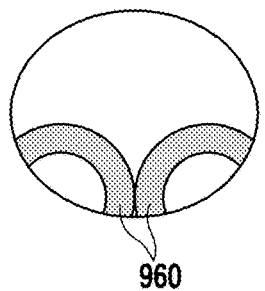
FIG. 9F is a diagram of an example of a technique for displaying content items, according to various embodiments of the present disclosure.

Referring to FIG. 9A-F, the second information may be displayed in various forms. Referring to FIG. 9A, the second information may be displayed in a portion of the right bottom of the display 160 that has a half circular shape, as shown in the diagram 910. Referring to FIG. 9B, the second information may be displayed in the form of two circular shapes that are smaller than the entire area of the display 160, as shown in the diagram 920. Referring to FIG. 9C, the second information may be displayed at the bottom of the entire area of the display 160 in the form of an oval shape as shown in the diagram 930. Referring to FIG. 9D, the second information may be displayed at the right bottom in the form of a circular shape that is smaller than the entire area of the display 160, as shown in the diagram 940. Referring to FIG. 9E, the second information may be displayed in the form of three circular corns, which are obtained by equally or unequally dividing the half circle of the bottom of the display 160 into three parts, as illustrated in the diagram 950. Referring to FIG. 9F, the second information may be displayed at the bottom of the display 160 in the form of a two half donuts as shown in the diagram 960.

Figure 10A:
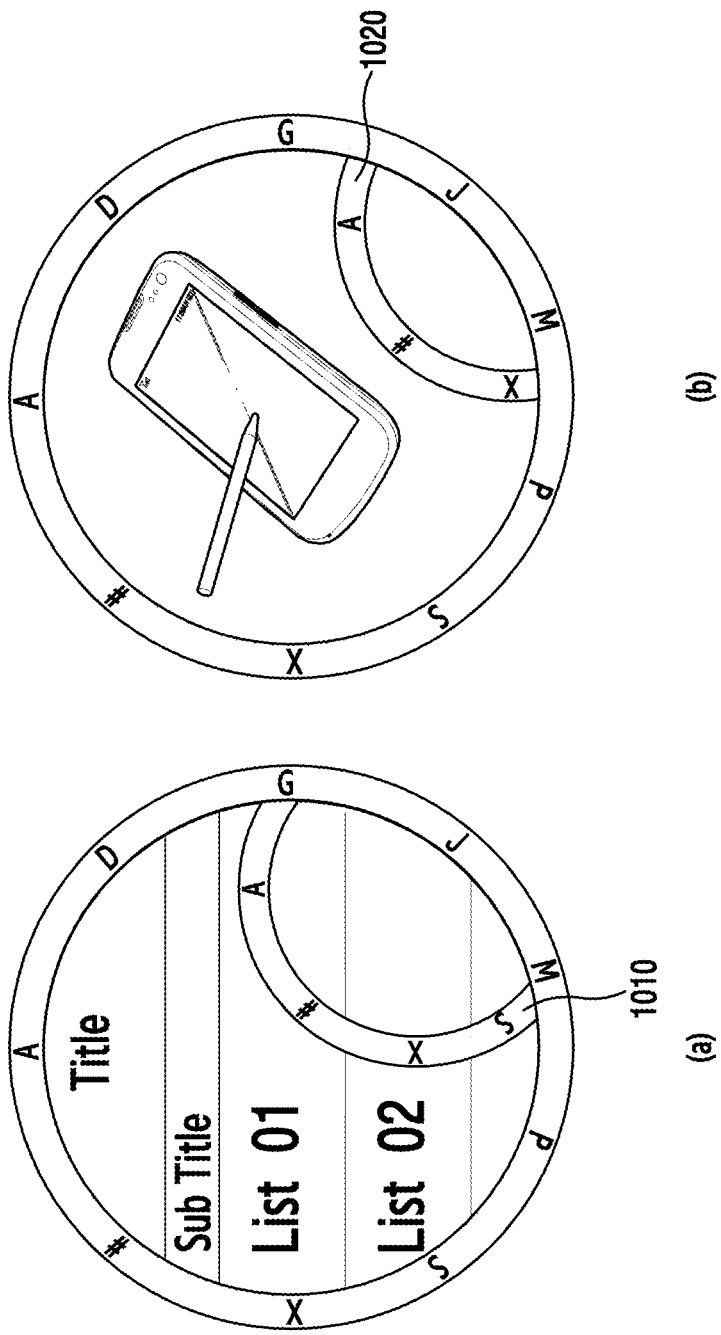
FIG. 10A is a diagram of an example of a user interface, according to various embodiments of the present disclosure.
Figure 10B:
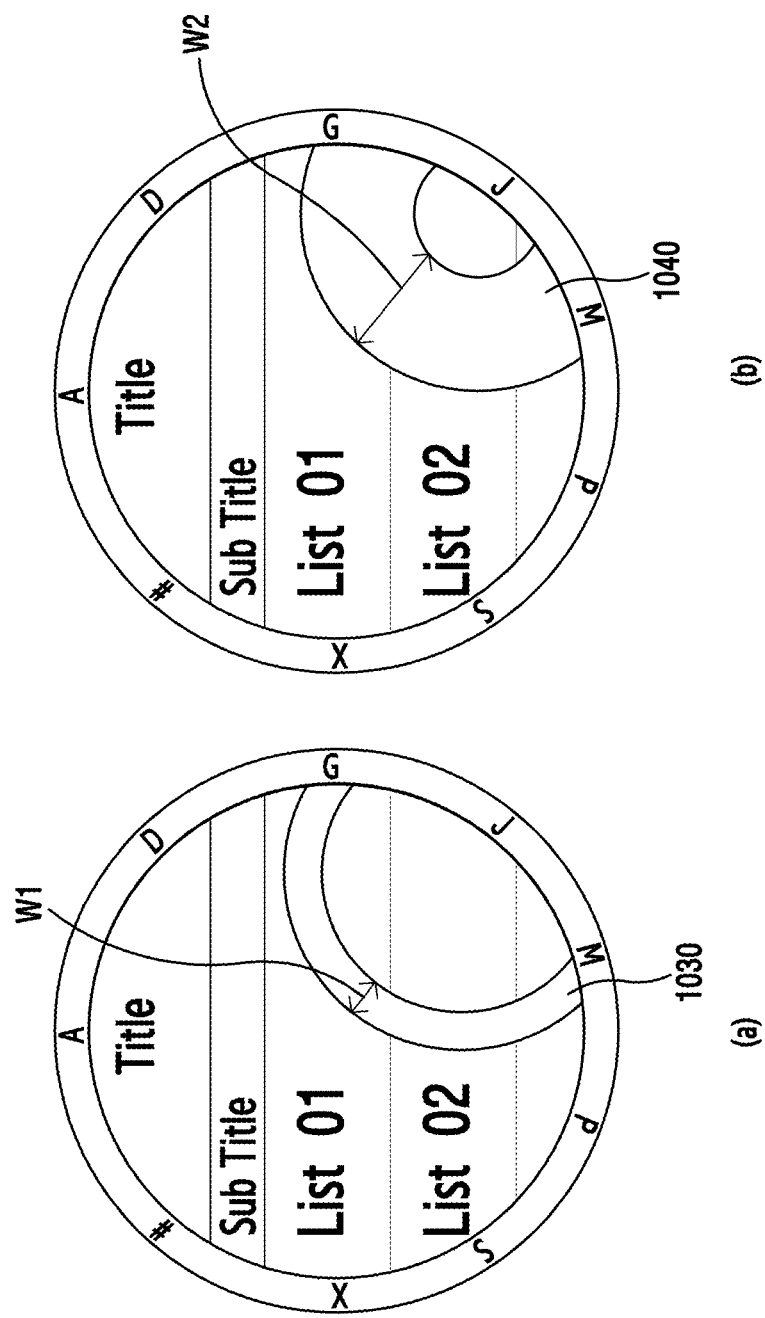
FIG. 10B is a diagram of an example of a user interface, according to various embodiments of the present disclosure.

FIGS. 10A-B are diagrams illustrating different examples of user interfaces, according to various embodiments of the present disclosure.

FIG. 10A illustrates an example of changing a display location of a second information. The processor 120 may adjust a display location of the second information based on the size of the screen of the display 160 and/or a first information displayed on the display 160, and/or the importance of the first information. Referring to the diagram (a) and the diagram (b), the processor 120 sets the display location of the second information as shown in the diagram 1010 when the size of the displayed first information is small, and sets the display location of the second information as shown in the diagram 1020 when the size of the displayed first information is large, so as not to disturb the user to recognize the first information.

According to various embodiments of the present disclosure, when the size of the screen of the display 160 is small, the size and the location of the second information may be set to be different based on a recognizable area.

FIG. 10B illustrates an example of changing a display area of a second information. When the second information is displayed in the form of a circular shape, there may be an empty space in the center of the lower portion. The processor 120 may adjust the display area of the second information based on the first information displayed on the display 160, the importance of the first information, and/or a type or size of an object included in the second information. The processor 120 may adjust the size of an object in the second information based on the size of the display area, and the property of the second information, such as a size, a color, a shape, and the like, is variously set. Referring to the diagram (a) and diagram (b), the width (W1) of the diagram 1030 is narrower than the width (W2) of the diagram 1040. For example, the display area of the second information may be set to be narrow, as shown in the diagram 1030, to enable some of the first information to be shown through the empty space under the portion where the second information is displayed, or the display area of the second information may be set to be broad, as shown in the diagram 1040, when the size of an object included in the second information is large.

Figure 11A:
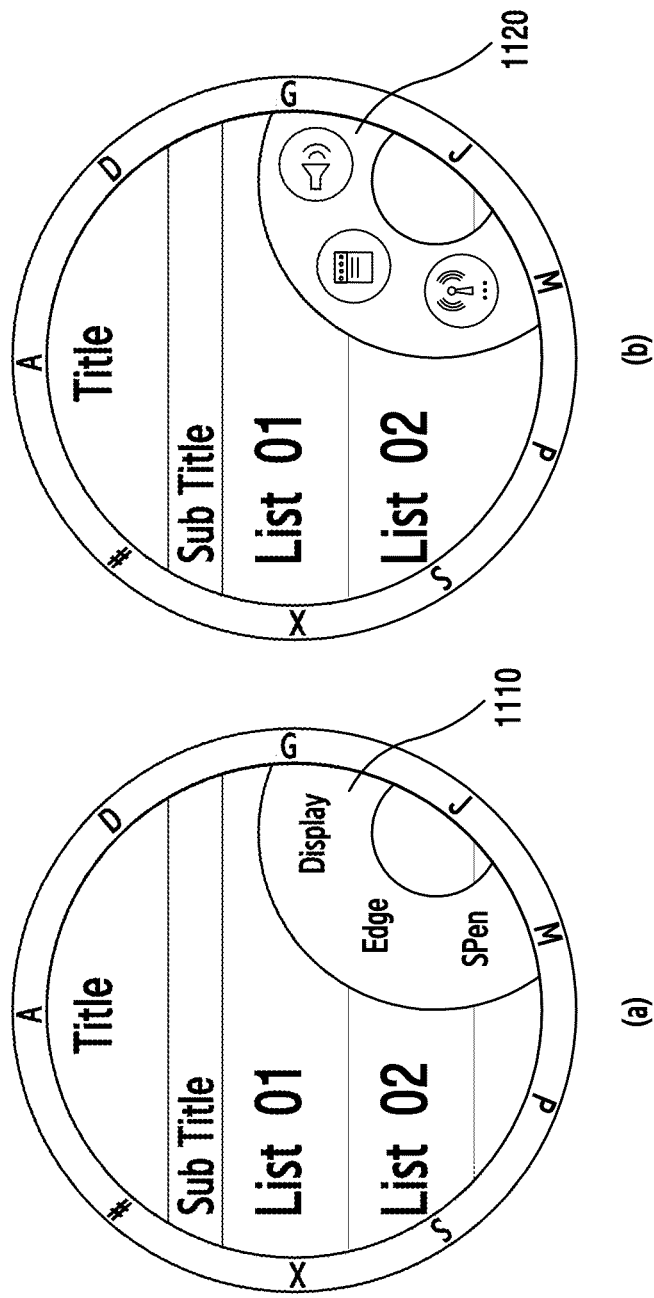
FIG. 11A is a diagram of an example of a user interface, according to various embodiments of the present disclosure.

FIGS. 11A-D are diagrams illustrating different examples of user interfaces, according to various embodiments of the present disclosure. FIG. 11A illustrates an example of changing a display method of a second information. The processor 120 may set a display method of the second information in various forms that indicate recognizable information. Referring to diagram (a), the second information may be displayed in the form of text, as shown in the diagram 1110. Referring to the diagram (b), the second information may be displayed in the form of an icon, as shown in the diagram 1120.

Figure 11B:
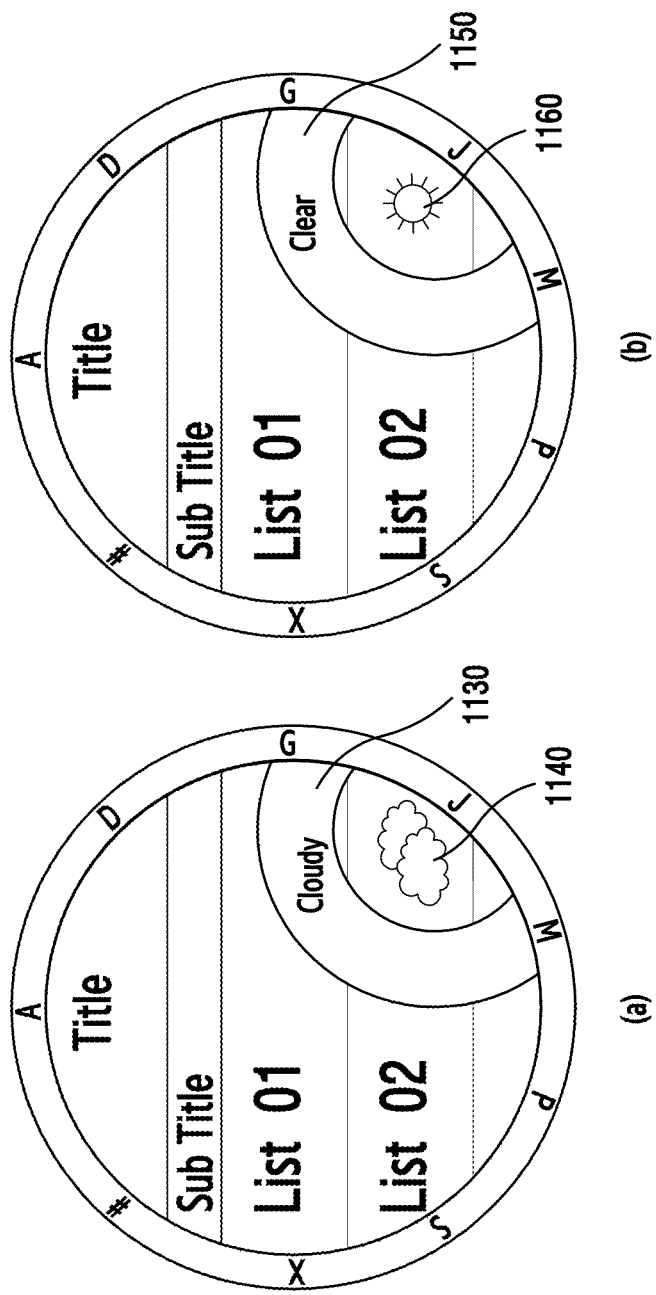
FIG. 11B is a diagram of an example of a user interface, according to various embodiments of the present disclosure.

FIG. 11B illustrates an example of displaying a second information using a complex display method. The processor 120 may set a display method of a second information in a complex form that includes both text and images. Referring to the diagram (a) according to various embodiments of the present disclosure, the second information may be displayed in the form of text (cloudy), as shown in the diagram 1130, and in the form of an image (an image of clouds), as shown in the diagram 1140. Referring to the diagram (b), the second information may be displayed in the form of text (clear), as shown in the diagram 1150, and in the form of an image (an image of the sun), as shown in the diagram 1160. Also, the second information may be displayed in the form of a widget. For example, when information, such as weather, is displayed, the second information may be a widget that is provided from a weather application.

According to various embodiments of the present disclosure, the processor 120 may set a color of the display area of the second information to be different based on a property of text or an image included in the second information. For example, the text in the diagram (a) of FIG. 11B is 'cloudy' and the text in the diagram (b) of FIG. 11B is 'clear', and thus, the processor 120 sets the display area of the second information to a dark color (e.g., grey) when the text is 'cloudy', and sets the display area of the second information to a bright color (e.g., white) when the text is 'clear'. Alternatively, the processor 120 may set the display area of the second information to a color that is distinguished based on text. The processor 120 sets the display area of the second information to blue when the text is 'cloudy' and sets the display area of the second information to red (e.g., white) when the text is 'clear'. When a different color is applied, a user may readily recognize what displayed information indicates based on only a color.

According to various embodiments of the present disclosure, the processor 120 expresses the second information in the form of text (e.g., cloudy or clear), and when an empty area is detected from first information, the processor 120 additionally expresses, in the empty area, the second information in the form of an image (e.g., an image of clouds or an image of the sun). Alternatively, the processor 120 expresses the second information in the form of an image (e.g., an image of clouds or an image of the sun), and when an empty area is detected from first information, the processor 120 additionally expresses, in the empty area, the second information in the form of text (e.g., cloudy or clear).

Figure 11C:
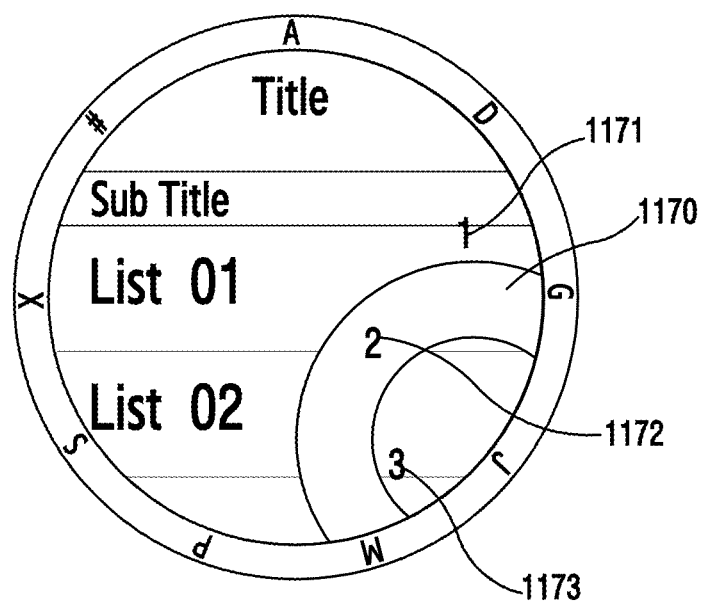
FIG. 11C is a diagram of an example of a user interface, according to various embodiments of the present disclosure.

FIG. 11C illustrates an example of an additional display location of a second information. Referring to FIG. 11C, the processor 120 expresses the second information 1172 inside a display area 1170 of the second information, and additionally expresses a third information 1171 and/or fourth information 1173 outside the display area 1170 of the second information. The additional display location of the second information may be outside (e.g., third information 1171) from the display area 1170 of the second information, or may be inside (e.g., fourth information 1173) the display area 1170. When two pieces of the second information exist, the second information may be presented as a second information and third information. When three pieces of the second information exist, the second information may be presented as the second information, the third information, and the fourth information. That is, FIG. 11C shows that three pieces of second information 1172, 1171, and 1173 exist, and thus, descriptions are provided by distinguishing second information as the second information 1172, the third information 1171, and the fourth information 1173, but the second information 1172, the third information 1171, and the fourth information 1173 may be second information.

Figure 11D:
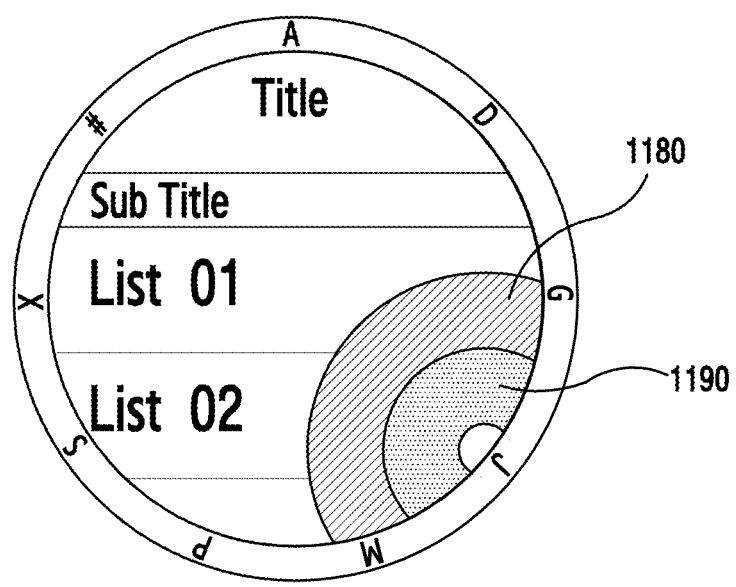
FIG. 11D is a diagram of an example of a user interface, according to various embodiments of the present disclosure.

FIG. 11D illustrates another example of an additional display location of a second information. Referring to FIG. 11D, the processor 120 sets a display area 1180 and 1190 of the second information to a donut shape, and at least two or more donut shapes are displayed in an overlapping manner. When a rotary input is provided, the display area 1180 and 1190 of the second information may be rotated by an identical quantity or speed, or different quantities or speeds. For example, when a rotary input module (e.g., the rotary input module 22 of FIG. 4A) through which a rotary input is provided, is a circular shape, a quantity or a speed of rotation may be set in proportion to the diameter of a circle.

Figure 12A:
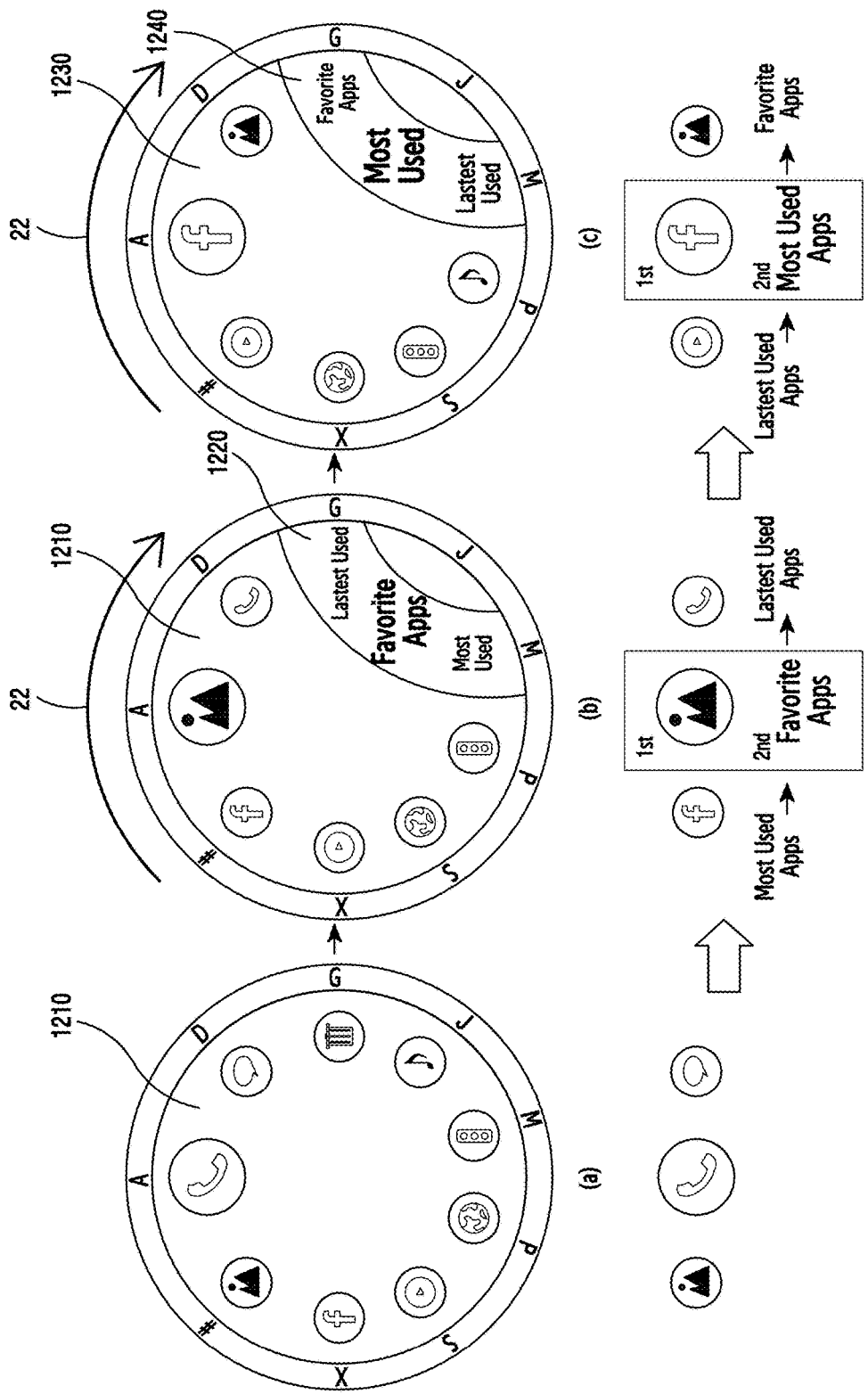
FIG. 12A is a diagram of an example of a user interface, according to various embodiments of the present disclosure.
Figure 12B:
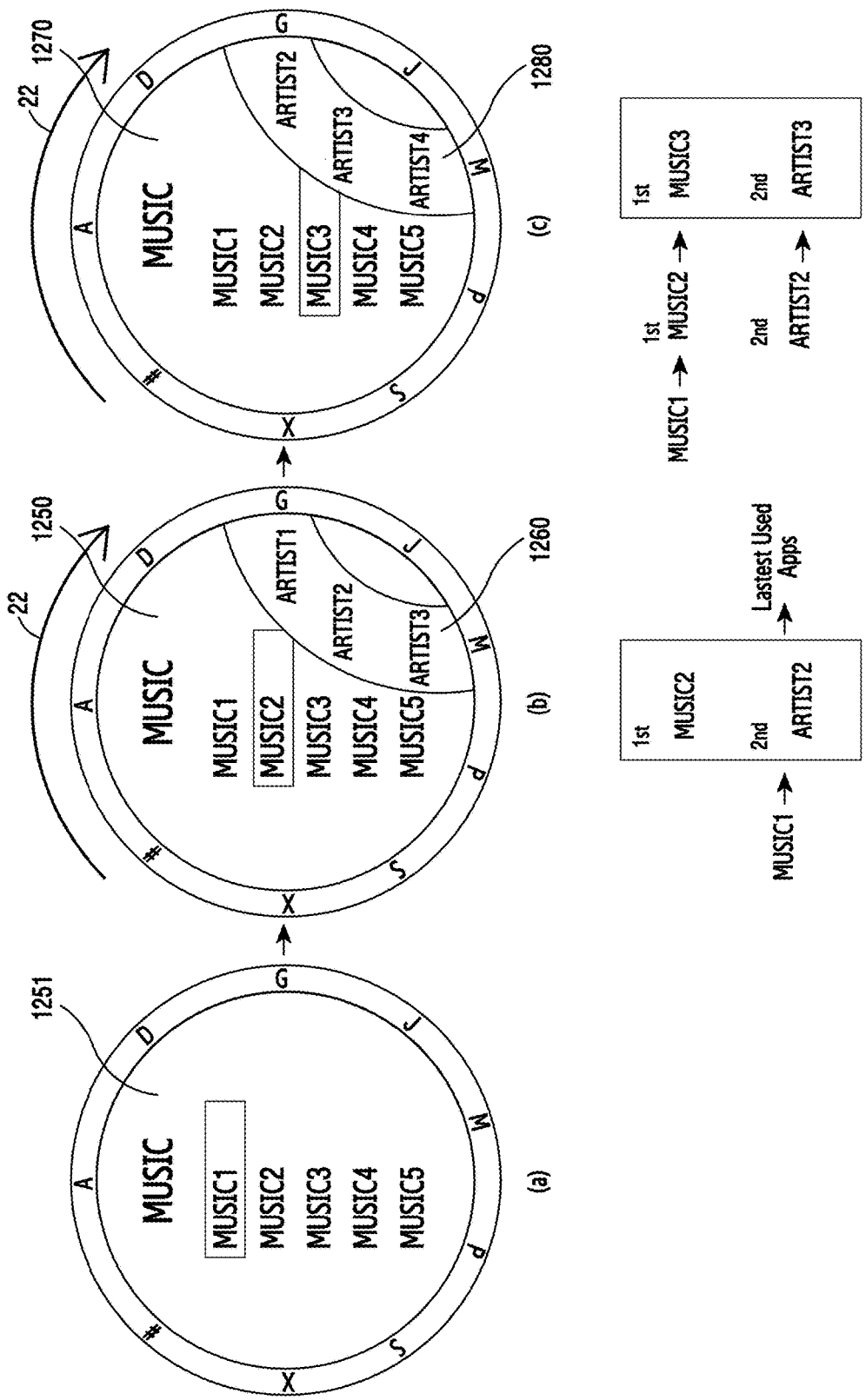
FIG. 12B is a diagram of an example of a user interface, according to various embodiments of the present disclosure.

FIGS. 12A-B are diagrams illustrating different examples of user interfaces, according to various embodiments of the present disclosure.

FIG. 12A illustrates an example in which a first information and a second information are scrolled. Referring to the diagram (a) of the FIG. 12A, the display 160 may display an application list as the first information 1210. The first information 1210 may be provided in the form of an icon associated with a plurality of applications installed in the electronic device 101. A selection indicator may be located on a call application (e.g., a call icon) in the first information 1210. A first object (e.g., a call icon) where the selection indicator is located may be highlighted, may be enlarged when compared to other objects, or may be boldened.

Referring to the diagram (b) of the FIG. 12A, when the rotary input module 22 detects a rotary input provided clockwise, the processor 120 may display the first information 1210 and the second information 1220 together on the display 160. The second information 1220 may be a name or an icon associated with at least one out of a recently used application (Latest Used Apps), a bookmark application (Favorite Apps), and/or a frequently used application (Most Used Apps). The selection indicator may pass one application icon (e.g., call→gallery) and may be located on a gallery application in the first information 1210, based on the rotary input. A selection indicator may be located on a bookmark application (Favorite Apps) in the second information 1220. Although not illustrated, the selection indicator in the first information 1210 may be located on a call application as it is, as shown in the diagram (a) of the FIG. 12A. A point in time when the second information is displayed may be set to be various, such as immediately after the rotary input is detected, after the selection indicator moves, after a predetermined period of time elapses, and the like.

Referring to the diagram (c) of the FIG. 12A, the processor 120 scrolls the first information 1230 and the second information 1240 based on a rotary input. The selection indicator may pass one application icon (e.g., gallery→Facebook) and may be located on Facebook application in the first information 1230, based on the rotary input. The selection indicator in the second information 1240 may pass one application (e.g., Favorite Apps→Most Used) and may be located on a frequently used application (Most Used Apps). According to various embodiments of the present disclosure, in the first information 1230 and the second information 1240, the number of objects (quantity or speed) that a selection indicator passes may be identical or different. The number of objects that the selection indicators of the first information 1230 and the second information 1240 pass may be different based on the settings of the electronic device 101 or settings by the user.

FIG. 12B illustrates an example of scrolling the first information and the second information, and displaying the same in a music list providing screen. Referring to the diagram (a) of the FIG. 12B, the display 160 may display a music list as first information 1251. The first information 1251 may be a music list that is arranged based on text (e.g., the titles of music). In the first information 1251, a selection indicator may be located on the title of music 'MUSIC 1'.

Referring to the diagram (b) of the FIG. 12B, when the rotary input module 22 detects a rotary input provided clockwise, the processor 120 may display the first information 1250 and the second information 1260 together on the display 160. The second information 1260 may be a music list that is arranged based on the names of artists. The selection indicator in the first information 1250 may pass one music object (e.g., MUSIC1→MUSIC 2) based on the rotary input, and may be located on the title of music 'MUSIC2'. In the second information 1260, a selection indicator may be located on the name of an artist 'ARTIST 2'. Although not illustrated, the selection indicator in the first information 1250 may be located on 'MUSIC 1' as it is, as shown in the diagram (a) of the FIG. 12B.

Although it is described that a rotary input is detected clockwise, the processor 120 may operate in an equal or similar manner to the example of detecting a rotary input clockwise, even when a rotary input is detected counterclockwise.

Referring to the diagram (c) of the FIG. 12B, the processor 120 scrolls the first information 1270 and second information 1280 based on a rotary input, and may display the same. A selection indicator in the first information 1270 may pass one music object (e.g., MUSIC 2→MUSIC 3) based on the rotary input, and may be located on the title of music 'MUSIC 3'. A selection indicator in the second information 1280 may pass one artist object (e.g., ARTIST 2=>ARTIST 3), and may be located on the name of an artist 'ARTIST 3'.

Alternatively, although not illustrated, the first information is a music list arranged based on a rank, and displays 5 objects (e.g., a title and/or an artist) arranged based on a number. A selection indicator may be located on a first object (e.g., first rank-Call me baby) that includes the number '1', among the 5 objects. The second information includes 3 objects arranged in alphabetical order, and a selection indicator may be located in a first object (e.g., Addicted) that includes the letter "a" from among the 3 objects. For example, when the first information and the second information are scrolled based on a rotary input, the first information may show that the selection indicator is shifted from the object (e.g., first rank—Call me baby) including the number '1' to the object (e.g., second rank—Shine your light) including the number '2'. Also, the second information shows that the selection indicator is shifted from the object (e.g., Addicted) including the letter "a" to the object (e.g., Bring him home) including the letter "b".

Figure 13A:
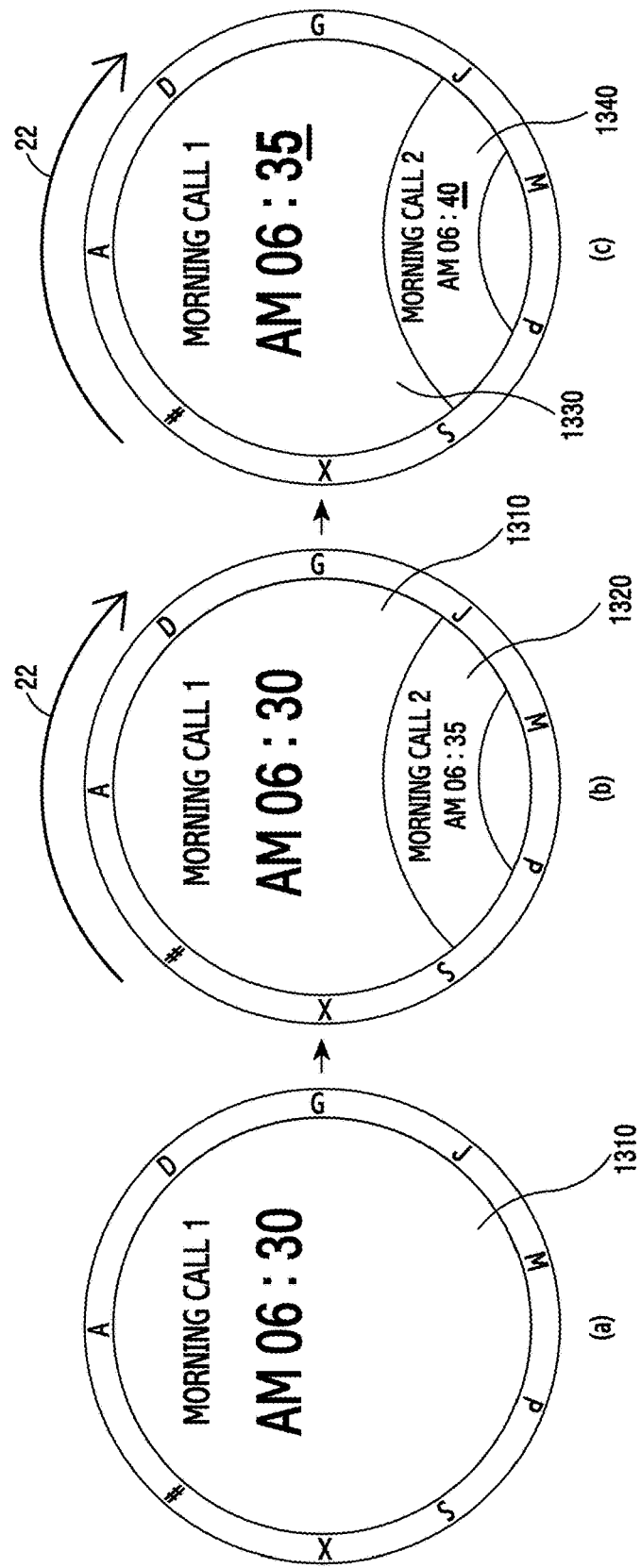
FIG. 13A is a diagram of an example of a user interface, according to various embodiments of the present disclosure.
Figure 13B:
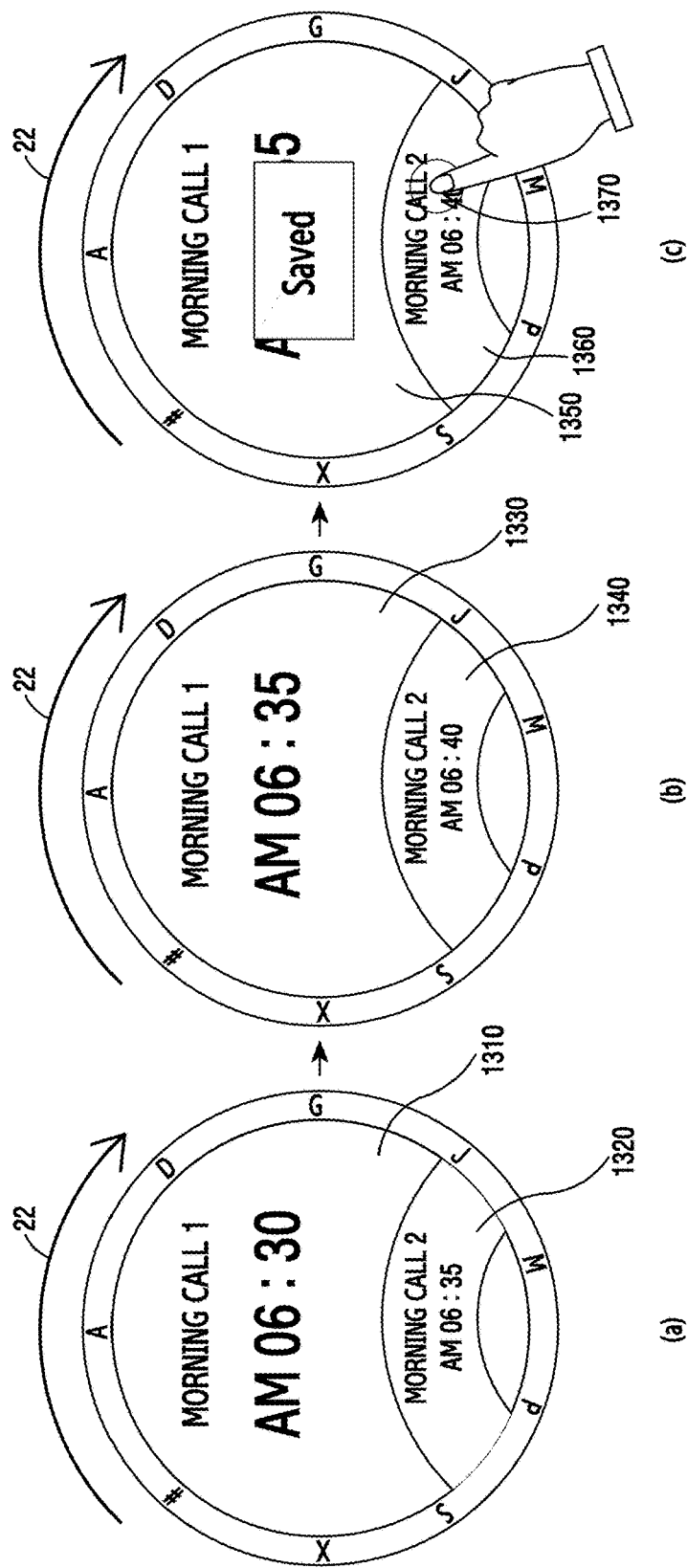
FIG. 13B is a diagram of an example of a user interface, according to various embodiments of the present disclosure.

FIGS. 13A-B are diagrams illustrating different examples of user interfaces, according to various embodiments of the present disclosure.

FIG. 13A illustrates an example that changes the first information and the second information, and displays the same in an alarm setting screen. Referring to the diagram (a), the display 160 may display the time for the first morning call (AM 06:30) as first information 1310. Referring to the diagram (b), when the rotary input module 22 detects a rotary input provided clockwise, the processor 120 may display the first information 1310 and the second information 1320 together on the display 160. The second information 1320 may be a time (AM 06:35) that is set to be within a predetermined period of time (e.g., 5 min.) from the time for the first morning call (AM 06:30). Although not illustrated, the first information 1310 may be changed, based on the rotary input, to a time (e.g., AM 06:35) that is 5 minutes after the time for the morning call of the diagram (a). Referring to the diagram (c), the processor 120 changes the first information 1330 and the second information 1340 based on a rotary input, and displays the same. Based on the rotary input, the first information 1330 may be changed to AM 06:35, which is the time after a predetermined time interval (e.g., 5 min.), and the second information 1340 may be changed to AM 06:40, which is the time after a predetermined time interval (e.g., 5 min.).

Although not illustrated, the processor 120 may display, as second information, a predetermined number of alarms, a related schedule, and the like. For example, when a large number of morning calls exist, the second morning call or the fourth morning call may be included in the second information. Also, when the time for the first morning call is included the first information, the second information may correspond to another function associated with time, such as a schedule, a timer, and the like.

FIG. 13B illustrates an example that changes the first information and the second information, and stores the same in an alarm setting screen. Referring to the diagram (a), when the rotary input module 22 detects a rotary input provided clockwise, the processor 120 may display a first information 1310 and a second information 1320 together in the display 160. Referring to the diagram (b), the processor 120 changes first information 1330 and second information 1340 based on a rotary input, and may display the same. Referring to the diagram (c), when a touch 1370 is input to second information 1360, the processor 120 may store the time for the first morning call and/or the time for the second morning call. For example, when the touch 1370 satisfies a predetermined condition (e.g., a touch that maintains during a predetermined period of time, a touch that quickly provides a tap, and the like), the processor 120 may store the time for the first morning call and/or the time for the second morning call. When no touch input exists, the processor 120 may correct the time for the first morning call, and may store the same.

According to various embodiments of the present disclosure, when a predetermined user input is detected, the processor 120 may execute a predetermined function, such as storing or scanning first information and/or second information displayed on the display 160. For example, when a predetermined user input is detected from the first information, the processor 120 may store or scan only the first information. When a predetermined user input is detected from the second information, the processor 120 may store or scan only the second information.

Figure 14:
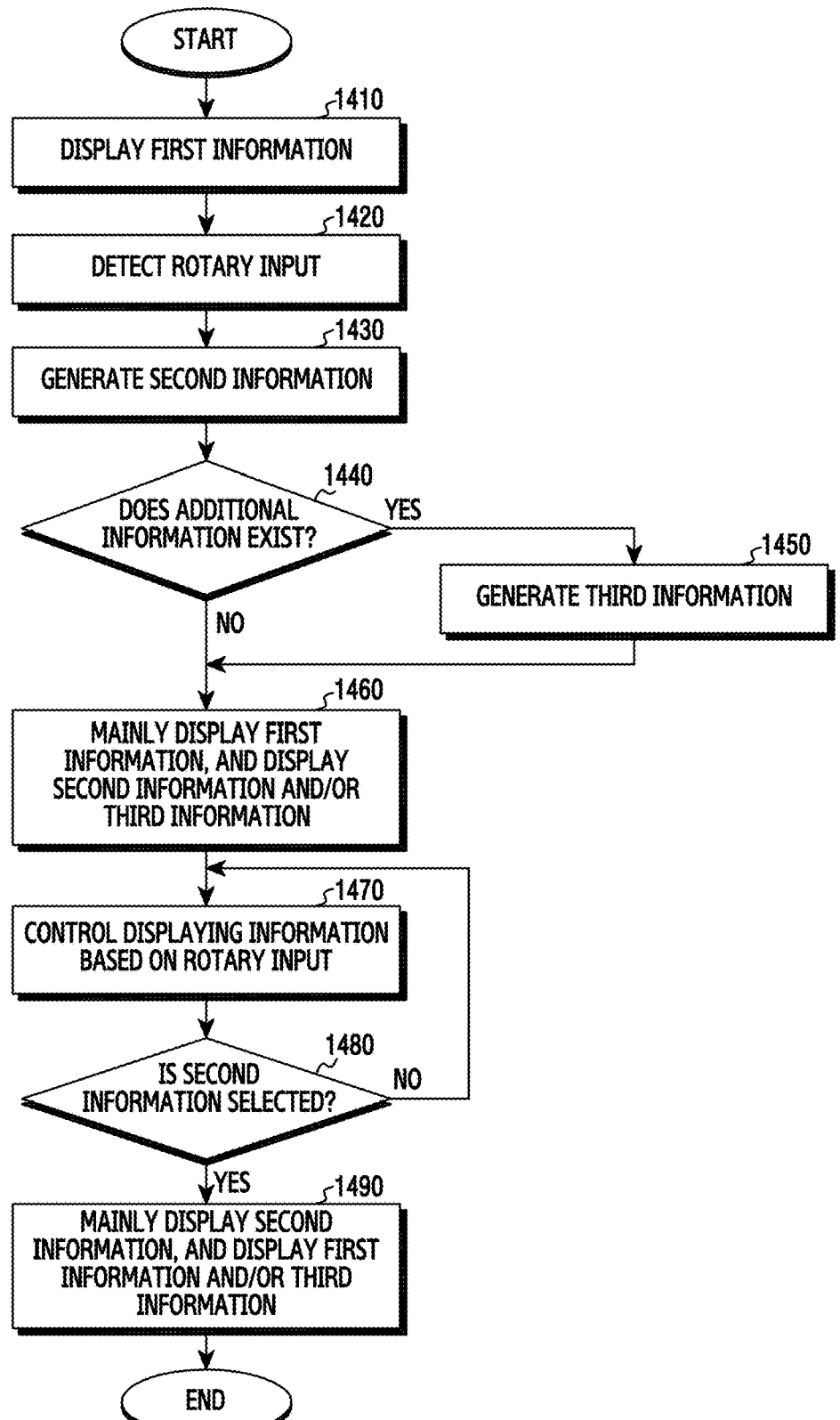
FIG. 14 is a flowchart of an example of a process, according to various embodiments of the present disclosure.

FIG. 14 is a flowchart of an example of a process, according to various embodiments of the present disclosure.

Referring to FIG. 14, the processor 120 displays a first information in operation 1410. The first information may include all types of information that is displayable on the display 160.

In operation 1420, the processor 120 detects a rotary input. For example, when a detected signal is received from the rotary 157 that is one type of the user input module 150 or from the rotary input module 22, the processor 120 may determine that a rotary input is detected.

In operation 1430, the processor 120 generates a second information that is associated with the displayed first information. According to various embodiments of the present disclosure, the second information may be at least one out of: some of first information that is not displayed on the display 410; at least some of an object before or after an object that is currently included the first information; an object of which an index is arranged to be different from the first information; an object that is frequently used from among objects included in the first information; an object that is recently used from among the objects included in the first information; an object that is registered in a bookmark from among the objects included in the first information; and an object that is associated with property information of the first information and hardware.

In operation 1440, the processor 120 may determine whether additional information that is associated with the displayed first information exists. For example, the processor 120 may determine that the additional information exists when at least two pieces of second information exist.

When the additional information exists, the processor 120 may generate third information that is associated with the displayed first information in operation 1450. The third information may be used for distinguishing second information when a plurality of pieces of second information exist.

In operation 1460, the processor 120 mainly displays the first information, and displays the second information and/or the third information. For example, the processor 120 may execute a control to display the first information in a portion of the display 160, and to display the second information and/or the third information at least partially in the portion. That is, the ratio that the first information occupies in the display 160 may be higher than the ratio that the second information and/or the third information occupy.

In operation 1470, the processor 120 controls displaying of the first information, the second information, and/or the third information, based on the rotary input. For example, the processor 120 may shift a selection indicator in the first information from a first object to a second object, and may display the same. The processor 120 may shift a selection indicator in the second information from a second object to a third object, and may display the same. The processor 120 may shift the selection indicator in the third information from the second object to the third object, and may display the same.

In operation 1480, the processor 120 may determine whether the second information is selected. The method of selecting the second information may include various user inputs such as a touch, a gesture, proximity, hovering, selecting a button, voice, and the like. For example, when a user touches the second information displayed on the display 160, the processor 120 may determine that the second information is selected.

In operation 1490, the processor 120 mainly displays the second information, and displays the first information and/or the third information. The processor 120 may switch the display location of the first information and the display location of the second information. For example, the processor 120 may execute a control to display the second information in a portion of the display 160, and to display the first information and/or the third information at least partially in the portion. That is, the ratio that the second information occupies in the display 160 may be higher than the ratio that the first information and/or the third information occupy.

Alternatively, when the user touches the third information displayed on the display 160 in operation 1480, the processor 120 mainly displays the third information, and displays the first information and/or the second information, in a similar manner as operation 1490. Alternatively, when the user selects an object included in the first information, the processor 120 may execute the selected object, or may provide detailed information associated with the selected object. For example, when the user selects one object (e.g., an application) in the first information (e.g., an application list), the processor 120 may execute the selected application. Alternatively, when the user selects one object (e.g., music) in the first information (e.g., a music list), the processor 120 reproduces the selected music content, or may provide property information (e.g., an image, a time, a size, and the like) of the selected music content.

Figure 15A:
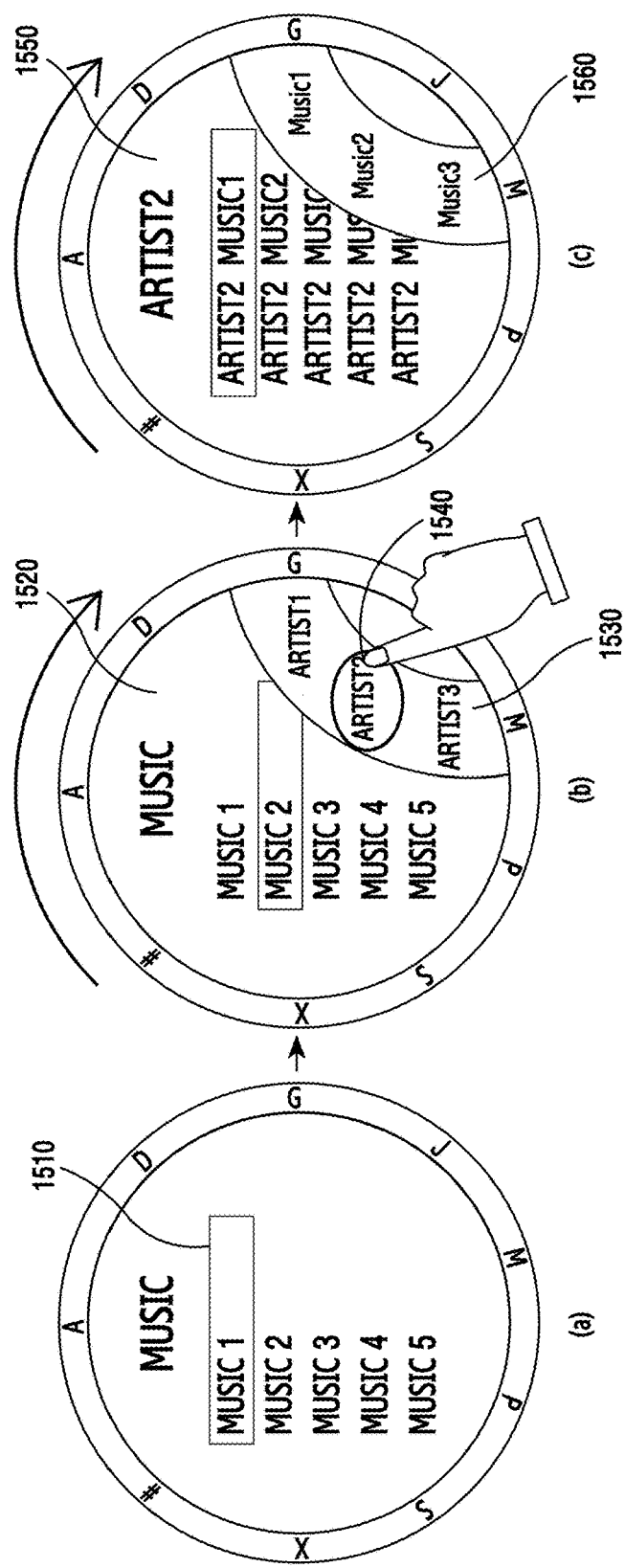
FIG. 15A is a diagram of an example of a user interface, according to various embodiments of the present disclosure.
Figure 15B:
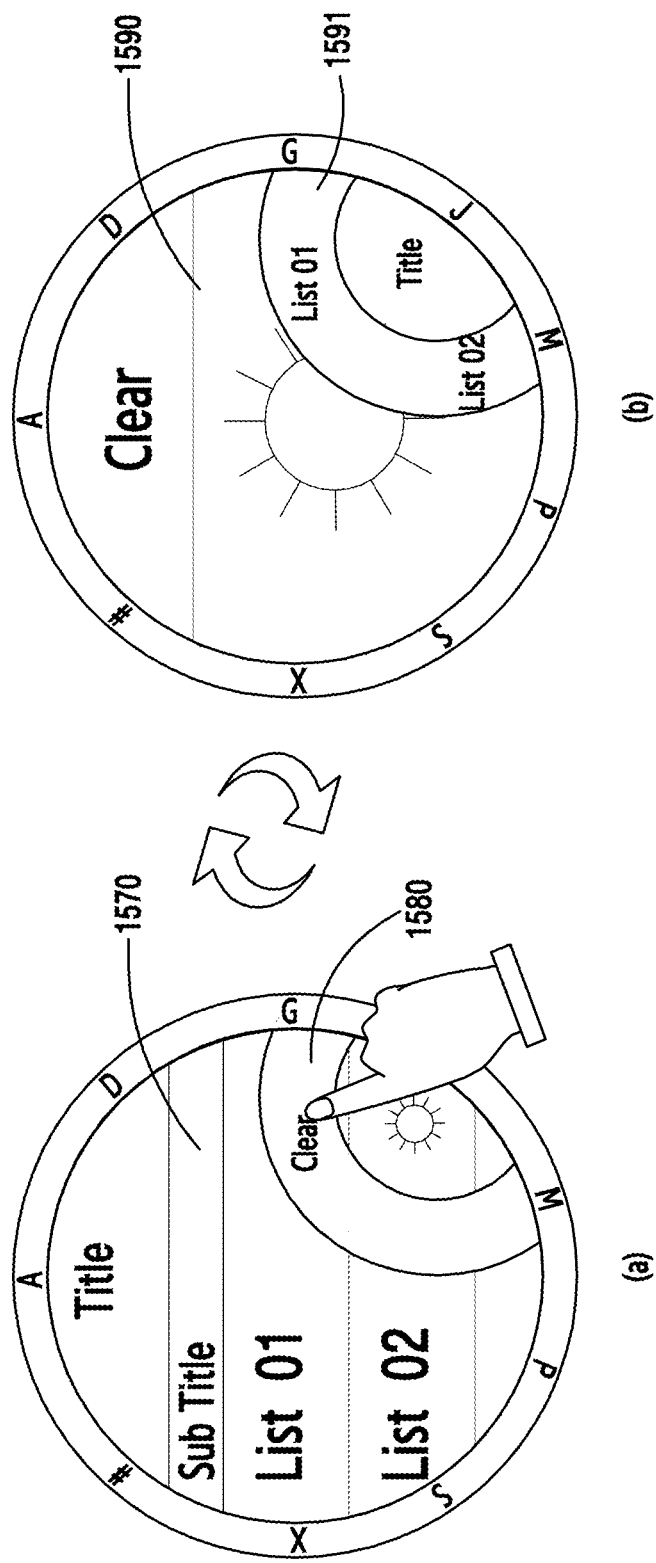
FIG. 15B is a diagram of an example of a user interface, according to various embodiments of the present disclosure.

FIGS. 15A-B are diagrams illustrating different examples of user interfaces, according to various embodiments of the present disclosure.

FIG. 15A illustrates an example that switches the locations of a first information and a second information, and displays the same in a 'music' application. Referring to the diagram (a), first information 1510 is a music list, and a selection indicator in the music list may be located on a first object (e.g., MUSIC 1). Referring to the diagram (b), when the rotary input module 22 detects a rotary input provided clockwise, the processor 120 may display the first information 1520 and second information 1530 together on the display 160. The selection indicator in the first information 1520 may pass one music object (e.g., MUSIC 1→MUSIC 2) based on the rotary input, and may be located on the title of music 'MUSIC 2'. In the second information 1530, a selection indicator may be located on the name of an artist 'ARTIST 2'.

In this instance, when a user touches 'ARTIST 2' included in the second information 1530, the processor 120 may detect a touch input 1540 provided to the 'ARTIST 2'. Referring to the diagram (c), the processor 120 determines that the second information 1530 is selected, and may switch the display locations of the first information 1560 and the second information 1550. That is, by comparing the diagram (b) and the diagram (c), the second information 1550 that is arranged based on the name of artists may be displayed in a portion of the display 160, and the first information 1560 that is arranged based on the titles of music may be superimposed onto the second information 1550.

Alternatively, when the user touches 'ARTIST 2' included in the second information 1530, and provides a movement (e.g., drag), the user may search only second information. For example, when no input is provided after 'ARTIST 2' is touched, or when a touch is continued during a predetermined period of time, it is determined that 'ARTIST 2' is selected. When 'ARTIST 2' is touched and moved, the processor 120 determines that the input is not for selecting 'ARTIST 2', but for moving an object in the second information 1530, and changes the objects in the second information and displays the same.

FIG. 15B illustrates an example that switches the display locations of a first information and a second information. Referring to the diagram (a), the processor 120 displays first information 1570 and second information 1580 together based on a rotary input. The first information 1570 may be an item list, and the second information 1580 may be weather information. The second information 1580 may display the text 'clear' in the form of a half donut shape, as weather information. Alternatively, when an empty space is detected in the first information 1570, the second information 1580 may display 'an image of the sun' together with text 'clear' in the form of a half circular shape.

According to various embodiments of the present disclosure, the second information may not be displayed when a predetermined period of time elapses, when a request from a user exists, when a rotary input provided in the opposite direction is detected, when a predetermined user input is detected, or based on the state (On/Off) of the screen of the display 160. For example, the processor 120 displays the second information during a predetermined period of time, and removes the second information after the predetermined period of time. When a request from a user to not display the second information exists, the processor 120 may remove the second information. When the display 160 is turned off or when a rotary input is detected, which is provided in the opposite direction to a rotation direction that enables the second information to be displayed, the processor 120 may remove the second information.

In this instance, when the user touches the second information 1580 ('clear' and or an image of the sun), the processor 120 may detect the touch input. Referring to the diagram (c), the processor 120 determines that the second information 1580 is selected, and may switch the display locations of first information 1591 and second information 1590. That is, by comparing the diagram (b) and the diagram (c), it is recognized that the second information 1590 corresponding to weather information is displayed in a portion of the display 160, and the first information 1591 corresponding to an item list is superimposed on the second information 1590.

A method of providing additional information based on a rotary input of an electronic device, according to various embodiments of the present disclosure, may include: detecting a rotary input of a rotary input module; generating second information associated with first information that is displayed in a display in response to the detection of the rotary input; displaying the first information and the second information in the display; and changing at least some of the first information and the second information based on the rotary input, and displaying the same.

The operation of detecting may include: detecting a rotary input when the rotary input module that is disposed in one side of a housing of the electronic device rotates.

The operation of changing and displaying may include shifting a selection indicator located in an object included in the first information or the second information, and displaying the same.

The second information may include at least one out of: at least some of the first information; information obtained or generated based on at least some of the first information; and information designated by a user.

The second information may include at least one out of: some of the first information; at least some of an object before or after an object displayed on the display as the first information; an object of which an index is arranged to be different from the first information; an object that is frequently used among objects included in the first information; an object that is recently used among the objects included in the first information; an object that is registered in a bookmark among the objects included in the first information; and an object that is associated with property information of the first information and hardware.

The operation of displaying may include: displaying the first information in at least a portion of the display, and displaying the second information at least partially in the portion.

The operation of displaying may include: separating a display area of the display into a first area and a second area, displaying the first information in the first area, and displaying the second information in the second area.

The method of providing additional information may further include: setting at least one of a type, the number of pieces, a location, a size, an area, a color, and a display method in association with the second information.

The quantities or speeds of changing, based on the rotary input, the first information and the second information may be identical to, or different from each other.

The method of providing additional information may further include: detecting whether the second information is selected; and switching display locations of the first information and the second information when the second information is selected.

The method of providing additional information may further include: when a predetermined user input is detected, storing or scanning the displayed first information and/or the second information.

A computer readable recording medium, according to various embodiments of the present disclosure, may include a program for implementing operations, the operations including: detecting a rotary input of a rotary input module; generating second information associated with first information that is displayed in a display in response to the detection of the rotary input; displaying the first information and the second information in the display; and changing at least some of the first information and the second information based on the rotary input, and displaying the same.

According to various embodiments of the present disclosure, a quick change and search is possible through a rotary input module.

According to various embodiments of the present disclosure, originally provided information and additional information are provided together based on a rotary input, and thus, a user may simultaneously determine a plurality of pieces of information in one screen.

According to various embodiments of the present disclosure, a plurality of pieces of information is displayed by a single user input and thus, the convenience of user may be improved.

FIGS. 1-15B are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. An electronic device, comprising:
   a housing;
   a circular display exposed through a portion of the housing;
   a rotatable structure, coupled to the housing, surrounding the circular display when viewed from above;
   a memory; and
   a processor operatively coupled to the memory, configured to:
      display, via the display, a portion of a first scrollable list including visual objects of a first group among a plurality of visual objects;
      in response to detecting that a rotational input from the rotatable structure is initiated, display, via the display, a portion of a second scrollable list including visual objects of a second group among the plurality of visual objects, wherein:
         any portion of the second scrollable list is not displayed prior to the detection of the rotational input,
         prior to the detection of the rotational input, the portion of the first scrollable list is displayed in a non-overlapped window, and
         the portion of the second scrollable list is displayed as superimposed on the portion of the first scrollable list after the detection of the rotational input; and
      while detecting that the rotational input is maintained, simultaneously scroll the first scrollable list in a first direction and the second scrollable list in a second direction distinct from the first direction.

2. The electronic device of claim 1, wherein the first scrollable list or the second scrollable list is one of an application list, a contact list, a music list, or an image list.

3. The electronic device of claim 1, wherein the processor is configured to:
   shift a first selection indicator located on one of the visual objects of the first group, and
   shift a second selection indicator located on one of the visual objects of the second group.

4. The electronic device of claim 1, wherein the second scrollable list includes at least one out of: at least some of the first scrollable list; information obtained or generated based on at least some of the first scrollable list; and information designated by a user.

5. The electronic device of claim 1, wherein the processor is configured to set at least one of a type, a number of visual objects, a location, a size, an area, a color, and a display method in association with the second scrollable list.

6. The electronic device of claim 1, wherein quantities or speeds of changing, according to the rotational input, of the first scrollable list and the second scrollable list are identical to, or different from each other.

7. The electronic device of claim 1, wherein the processor is configured to switch display locations of the first scrollable list and the second scrollable list when the second scrollable list is selected.

8. The electronic device of claim 1, wherein the processor is configured to store or scan the displayed first scrollable list and/or the second scrollable list when a predetermined user input is detected.

9. A method for use in an electronic device having a housing, a circular display, and a rotatable structure, wherein the rotatable structure, coupled to the housing, is surrounding the circular display when viewed from above, the method comprising:
   displaying a portion of a first scrollable list including visual objects of a first group among a plurality of visual objects;
   in response to detecting that a rotational input from the rotatable structure is initiated, displaying a portion of a second scrollable list including visual objects of a second group among the plurality of visual objects, wherein:
      any portion of the second scrollable list is not displayed prior to the detection of the rotational input,
      prior to the detection of the rotational input, the portion of the first scrollable list is displayed in a non-overlapped window, and
      the portion of the second scrollable list is displayed as superimposed on the portion of the first scrollable list after the detection of the rotational input; and
   while detecting that the rotational input is maintained, simultaneously scrolling the first scrollable list in a first direction and the second scrollable list in a second direction distinct from the first direction.

10. The method of claim 9, wherein the first scrollable list or the second scrollable list is one of an application list, a contact list, a music list, or an image list.

11. The method of claim 9, wherein the simultaneously scrolling comprises:
   shifting a first selection indicator located on one of the visual objects of the first group; and
   shifting a second selection indicator located on one of the visual objects of the second group.

12. The method of claim 9, wherein the second scrollable list includes at least one out of: at least some of the first scrollable list; information obtained or generated based on at least some of the first scrollable list; and information designated by a user.

13. The method of claim 9, further comprising:
   setting at least one of a type, a number of visual objects, a location, a size, an area, a color, and a display method in association with the second scrollable list.

14. A non-transitory computer-readable medium of an electronic device storing one or more processor-executable instructions, which when executed by at least one processor, cause the at least one processor to perform a method comprising the steps of:
   displaying a portion of a first scrollable list including visual objects of a first group among a plurality of visual objects;
   in response to detecting that a rotational input from a rotatable structure is initiated, displaying a portion of a second scrollable list including visual objects of a second group among the plurality of visual objects, wherein:
      any portion of the second scrollable list is not displayed prior to the detection of the rotational input,
      prior to the detection of the rotational input, the portion of the first scrollable list is displayed in a non-overlapped window, and
      the portion of the second scrollable list is displayed as superimposed on the portion of the first scrollable list after the detection of the rotational input; and
   while detecting that the rotational input is maintained, simultaneously scrolling the first scrollable list in a first direction and the second scrollable list in a second direction distinct from the first direction.

\* \* \* \* \*